US012480627B2

(12) United States Patent
Wu et al.

(10) Patent No.: US 12,480,627 B2
(45) Date of Patent: Nov. 25, 2025

(54) LIGHT BOARD STRUCTURE AND BULB CAP AND LIGHT BULB USING THE SAME

(71) Applicant: ZHANGZHOU GO WIN LIGHTING CO., LTD, Zhangzhou (CN)

(72) Inventors: Qingan Wu, Zhangzhou (CN); Xiongzhong Lin, Zhangzhou (CN); Yaying Huang, Zhangzhou (CN)

(73) Assignee: ZHANGZHOU GO WIN LIGHTING CO., LTD, Zhangzhou (CN)

(*) Notice: Subject to any disclaimer, the term of this patent is extended or adjusted under 35 U.S.C. 154(b) by 0 days.

(21) Appl. No.: 18/898,726

(22) Filed: Sep. 27, 2024

(65) Prior Publication Data

US 2025/0334233 A1 Oct. 30, 2025

(30) Foreign Application Priority Data

Apr. 30, 2024 (CN) ......................... 202420935123.3
Apr. 30, 2024 (CN) ......................... 202420943108.3

(51) Int. Cl.

*F21K 9/235* (2016.01)
*F21K 9/237* (2016.01)
*F21V 23/06* (2006.01)

(52) U.S. Cl.

CPC .............. *F21K 9/235* (2016.08); *F21K 9/237* (2016.08); *F21V 23/06* (2013.01)

(58) Field of Classification Search

CPC ........... F21K 9/235; F21K 9/237; F21V 23/06
See application file for complete search history.

(56) References Cited

U.S. PATENT DOCUMENTS

| | | | | |
|---|---|---|---|---|
| 2012/0075835 A1* | 3/2012 | Yoon | G02F 1/133603 | 362/97.1 |
| 2014/0153251 A1* | 6/2014 | Yang | F21V 7/0016 | 362/310 |
| 2015/0176831 A1* | 6/2015 | Zhang | F21S 8/085 | 362/294 |
| 2022/0260244 A1* | 8/2022 | Selak | F21K 9/232 | |

FOREIGN PATENT DOCUMENTS

| | | | |
|---|---|---|---|
| CA | 2687529 C * | 11/2010 | F21K 9/232 |

* cited by examiner

*Primary Examiner* — Evan P Dzierzynski

(57) ABSTRACT

The disclosure provides a light board structure and a bulb cap and light bulb using the same. The conductive column of the light bulb is directly fixed on the middle of the circuit board of the light board structure, so that when assembling the bulb cap of the light bulb, the conductive column and the light board structure can be assembled by one process (or in the same stage), which improves the efficiency of light bulb assembling. In this application, the light board structure is connected to the power supply by the conductive column and the conductive layer, compared with the traditional form in which conductive wires are used, the light board structure of the present disclosure has a higher integration degree, and the structural optimization of the circuit board makes the installation operation simpler and more efficient.

18 Claims, 25 Drawing Sheets

LIGHT BOARD STRUCTURE AND BULB CAP AND LIGHT BULB USING THE SAME

TECHNICAL FIELD

The present disclosure relates to the technical field of light bulb circuit board and light bulb structure, in particular to a light board structure and a bulb cap and a light bulb using the light board structure.

BACKGROUND

As a common device for daily lighting and heightening atmosphere, light bulbs are widely used in various scenes. At present, the structure of most LED light bulbs includes a bulb cover, a circuit board, a light-emitting module, a bulb cap shell and an electrical foot contact (for example, Chinese patent publication No. CN 214198212 U). Due to the structural characteristics of the bulb cap shell, in most of the current light bulbs, the circuit board will lead out connecting wires or metal pins for the circuit board to connect to the neutral and live wires of the power supply. Among them, the neutral wire is mostly in contact with the bulb cap shell made of conductive material, and the live wire is in contact with the electrical foot contact. With this structure, when the light bulbs are being produced and packaged, since the bulb cap shell and the bulb cover need to be further fixed and connected in this process, and the connecting wires or metal pins have a certain degree of freedom of movement (material characteristics or contact connection characteristics), the connection status or position reliability of the connecting wires and the bulb cap shell and the electrical foot contact will somehow be affected, such that the contact situation between the connecting wires on the circuit boards of different light bulbs and the bulb cap shell and the electrical foot contact is different, which to a certain extent affects the yield of the light bulb during production and its life in later use. Meanwhile, it will also affect the efficiency and structural consistency of the light bulb during installation. Therefore, how to optimize the structure of the light board and the connection structure between the light board and the bulb cap shell to improve the assembly efficiency and yield of the light bulb, as well as the reliability of use is a very positive and practical research topic.

SUMMARY

In view of this, the objective of the present disclosure is to provide a light board structure that is easy to assemble, simple in structure and reliable in implementation, and a bulb cap and a bulb using the light board structure.

In order to achieve the above technical objectives, the technical solution adopted by the present disclosure is as follows.

A light board structure for a light bulb, comprising:

a circuit board, wherein the circuit board has a first surface and a second surface located opposite to each other, the first surface is provided with a light emitting module, and the light emitting module has a first terminal and a second terminal configured to connect to a power supply;

a conductive column, wherein an end of the conductive column is fixed to a middle part of the second surface of the circuit board and is electrically connected to the first terminal of the light emitting module; and a conductive layer, wherein the conductive layer is arranged on the circuit board, the conductive layer is spaced apart from the conductive column and is insulated with the conductive column, the conductive layer is electrically connected to the second terminal of the light emitting module.

As a possible implementation, further, the conductive layer in this solution is arranged on the second surface of the circuit board, the conductive layer has an annular structure, and the conductive column is located within the annular structure of the conductive layer;

wherein, an outer edge of the annular structure of the conductive layer extends to the outer edge of the second surface of the circuit board, or a separation area is formed between the outer edge of the annular structure of the conductive layer and the outer edge of the second surface of the circuit board.

As a possible implementation, further, the number of the conductive layer in this solution is at least one; and all of the at least one conductive layer is arranged on the second surface and is electrically connected to the second terminal of the light emitting module;

when one conductive layer is provided, the conductive layer is located in an region of the second surface on a side of the conductive column; and when a plurality of conductive layers are provided, the plurality of conductive layers are arranged on the second surface surrounding around the conductive column in an annular pattern.

In addition to the above-mentioned locations where the conductive layer is arranged, the conductive layer may also be arranged on the first surface or an outer peripheral side of the circuit board.

As a possible implementation, further, the light emitting module in this solution is an LED light emitting module; the light emitting module is powered by a mains supply, the conductive column is configured to connect to a live wire of the mains supply, and the conductive layer is configured to connect to a neutral wire of the mains supply.

Based on the above description, the present disclosure also provides a bulb cap assembly method in which the above-mentioned light board structure is used, the bulb cap further includes a bulb cap shell, wherein the bulb cap shell is a cylindrical shell structure with two ends open and is configured to connect to a bulb socket, and an end of the bulb cap shell has a contracted structure; the bulb cap shell is configured to connect to the neutral line of the mains supply, and the conductive column is configured to connect to the live line of the mains supply, and the assembly method includes:

putting the light board structure in the bulb cap shell to make the conductive layer in direct or indirect contact with an inner wall of the bulb cap shell, and passing the conductive column through the contracted structure of the bulb cap shell to be exposed outside the bulb cap shell.

As a preferred implementation, further, the bulb cap mentioned in the assembly method of this solution further includes a gasket and a conductive ring, the gasket is made of an elastic insulating material, and the gasket is provided with a through hole corresponding to the conductive column; the conductive ring is an electrically conductive member, and at least one conductive sheet extending outward is provided at intervals on an outer periphery of the conductive ring, and the at least one conductive sheet is configured to be attached with the inner wall of the bulb cap shell; on this basis, the assembly method includes:

attaching an end surface of the gasket to the second surface of the circuit board, and passing the conductive column through the through hole of the gasket;

arranging the conductive ring on the circuit board and making the conductive ring in contact with the conductive layer;

putting the light board structure equipped with the gasket and the conductive ring in the bulb cap shell and making the conductive layer in direct or indirect contact with the inner wall of the bulb cap shell, and passing the conductive column through the contracted structure of the bulb cap shell to be exposed outside the bulb cap shell.

Based on the above description, the present disclosure further provides a bulb cap, which includes the light board structure described above, and the bulb cap further includes:

a bulb cap shell, wherein the bulb cap shell is a cylindrical shell structure with two ends open, the bulb cap shell is formed of a conductive material and is configured to connect with a bulb socket, an end of the bulb cap shell has a contracted structure;

a gasket, wherein the gasket is made of an elastic insulating material, an end surface of the gasket is attached to the second surface of the circuit board, and the gasket is provided with a through hole corresponding to the conductive column;

wherein, the circuit board of the light board structure is arranged in a cylindrical structure at an end of the bulb cap shell, the other end surface of the gasket is at least partially in contact with the inner wall of the contracted structure of the bulb cap shell, the other end of the conductive column sequentially passes through the through hole of the gasket and the contracted structure of the bulb cap shell, and is exposed outside the bulb cap shell, and the conductive column is spaced and insulated with the bulb cap shell; the conductive layer on the second surface of the circuit board is in direct or indirect contact with the inner wall of the bulb cap shell.

As a preferred optional implementation, further, the bulb cap of this solution further includes:

a conductive ring, wherein the conductive ring is an electrically conductive member, the conductive ring is arranged on the second surface of the circuit board and is in contact with the conductive layer, an outer circumferential side of the conductive ring is provided with at least one conductive sheet extending outwards at intervals, and the conductive sheet is configured to be attached with the inner wall of the bulb cap shell;

wherein, the conductive ring is spaced apart and insulated from the conductive column.

As a preferred optional implementation, further, an outer contour of the gasket described in this solution is matched with the circuit board of the light board structure, an end surface of the gasket is attached with the second surface of the circuit board and partially covers the conductive ring.

As a preferred optional implementation, further, the conductive column and the through hole in this solution are in interference fit.

As a preferred optional implementation, further, the other end surface of the gasket of this solution is provided with a protrusion corresponding to the contracted structure of the bulb cap shell, the protrusion partially passes through the contracted structure of the bulb cap shell, and the through hole extends through the protrusion.

Based on the above description, the present disclosure further provides a light bulb, which includes the bulb cap described above, and the light bulb also includes:

a bulb cover, wherein the bulb cover is a hollow structure with an open end, and the open end is connected to the bulb cap shell.

By adopting the above technical solutions, the present disclosure has the following advantages compared with the prior art: according to the solution the conductive column (also called electrical foot contact) of the light bulb is directly fixed on the middle of the circuit board of the light board structure, so that when assembling the bulb cap of the light bulb, the conductive column and the light board structure can be assembled by an one-step process, which improves the efficiency of light bulb assembly, while the light board structure of the traditional solution usually requires two steps to separately install the circuit board and the conductive column. In particular, when assembling the traditional bulb cap, the conductive column is mostly inserted from the outside of the bulb cap shell into the bulb cap shell to be combined with the circuit board. There is a certain probability that the conductive column and the circuit board may have poor contact or cause external force damage to the circuit board. The present disclosure directly integrates or combines the conductive column with the circuit board. During installation, the conductive column travels across the inside of the bulb cap shell, which ensures that the connection between the light-emitting module on the circuit board and the conductive column is reliable and avoids the requirement of relatively large external force to assist the installation. In addition, the light board structure of this solution is connected to the power supply through the conductive column and the conductive layer. Compared with the traditional form in which conductive wires are used, the light board structure of the present disclosure has a higher integration degree, and the structural optimization of the circuit board makes the installation operation simpler and more efficient. On this basis, the bulb cap of the present disclosure adopts a gasket made of elastic insulating material as a bonding part between the light board structure and the contracted structure of the bulb cap shell, which improves the waterproof ability of the bulb cap shell and improves the installation tightness and stability of the light board. In order to better improve the connection stability between the conductive layer on the light board structure and the bulb cap shell, the bulb cap of this solution is also connected with the conductive layer on the circuit board through a conductive ring, and the conductive sheet/s on the conductive ring is attached to the inner wall of the bulb cap shell, thereby improving the connection reliability between the conductive layer in the light board structure and the bulb cap shell.

BRIEF DESCRIPTION OF THE DRAWINGS

In order to more clearly illustrate the embodiments of the present disclosure or the technical solutions in the prior art, the drawings required for illustrating the embodiments or the description of the prior art will be briefly introduced below. Obviously, the drawings described below merely involve some embodiments of the present disclosure. For those of ordinary skill in the art, other drawings may be derived based on these drawings without creative efforts.

DETAILED DESCRIPTION OF THE EMBODIMENTS

The present disclosure will be further described in detail below in conjunction with the accompanying drawings and embodiments. It should be particularly noted that the following embodiments are merely used to illustrate the present disclosure rather than limit the scope of the present disclosure. Similarly, the following embodiments are merely part of the embodiments of the present disclosure rather than all. All other embodiments obtained by those of ordinary skill in the art without creative effort should be considered as falling within the scope of protection of the present disclosure.

Embodiment 1

Figure 1:
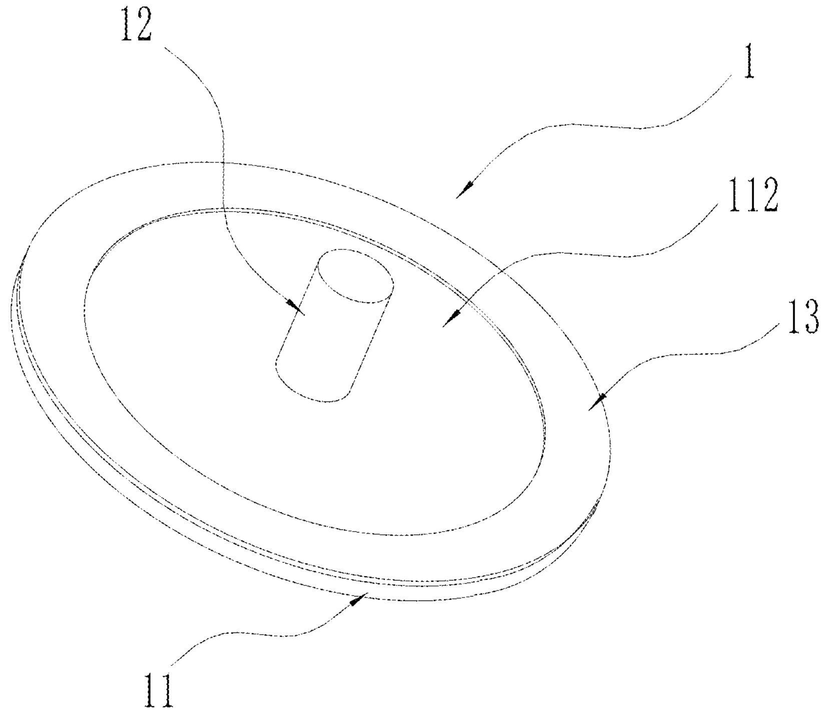
FIG. 1 is a first schematic diagram of an example implementation structure of a light board structure in a perspective view according to Embodiment 1 of the present disclosure.
Figure 2:
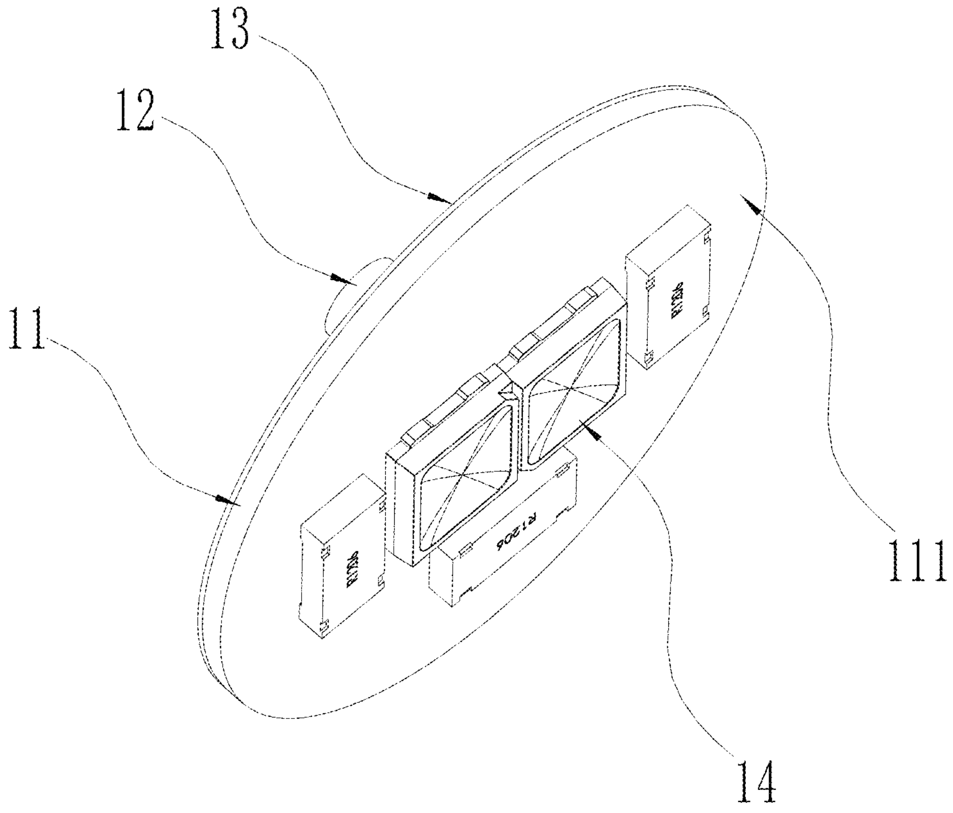
FIG. 2 is a second schematic diagram of the example implementation structure of the light board structure in a perspective view according to Embodiment 1 of the present disclosure.

As shown in FIG. 1 or FIG. 2, according to the present embodiment, a light board structure 1 configured to be used in a light bulb includes:

- a circuit board 11, wherein the circuit board has a first surface 111 and a second surface 112 opposite to each other, the first surface 111 is provided with a light emitting module 14, the light emitting module 14 has a first terminal 141 and a second terminal 142 for connecting to a power supply (see FIG. 3);
- a conductive column 12, wherein an end of the conductive column is fixed to the middle of the second surface 112 of the circuit board 11 and is connected to the first terminal 141 of the light emitting module 14; and
- a conductive layer 13, wherein the conductive layer 13 is disposed on the second surface 112 of the circuit board 11 and is spaced and insulated from the conductive column 12 (i.e. the conductive layer 13 and the conductive column 12 are not in contact and are not electrically connected to each other on the second surface 112), the conductive layer 13 is connected to the second terminal 142 of the light emitting module 14.

In this embodiment, the conductive layer 13 is an annular structure, and the conductive column 12 is located within the annular structure of the conductive layer 13.

Optionally, an outer edge of the annular structure of the conductive layer 13 extends to an outer edge of the second surface of the circuit board.

According to the present embodiment, the way that the first terminal 141 and the second terminal 142 of the light emitting module 14 on the circuit board 11 are connected to the conductive column 12 and the conductive layer 13 respectively may be realized by setting conductive holes on the circuit board 11, or by setting through holes (i.e. holes that pass through the first surface 111 and the second surface 112), and then wring connection lines via the through holes, or the end of the conductive column 12 fixed to the middle of the second surface 112 of the circuit board 11 further passes through the circuit board 11 and extends to the first surface 111 of the circuit board 11, and is electrically connected to the first terminal of the light emitting module 14. These are all common ways of connecting components on the circuit board 11, and will not be described in further details herein.

As a possible implementation, further, the light emitting module 14 in this embodiment is an LED light emitting module; the light emitting module 14 is powered by mains supply, the conductive column 12 is configured to connect to the live wire of the mains supply, and the conductive layer 13 is configured to connect to the neutral wire of the mains supply.

In this embodiment, when the light board structure 1 is used in a light bulb, the circuit board 11 is arranged in the bulb cap shell of the light bulb, wherein the conductive column 12 on the second surface 112 of the circuit board 11 passes through the bulb cap shell and is electrically connected to the live wire of the mains supply; the conductive layer 13 on the second surface 112 contacts the bulb cap shell, and then the bulb cap shell is connected to the neutral wire of the mains supply.

Embodiment 2

Figure 4:
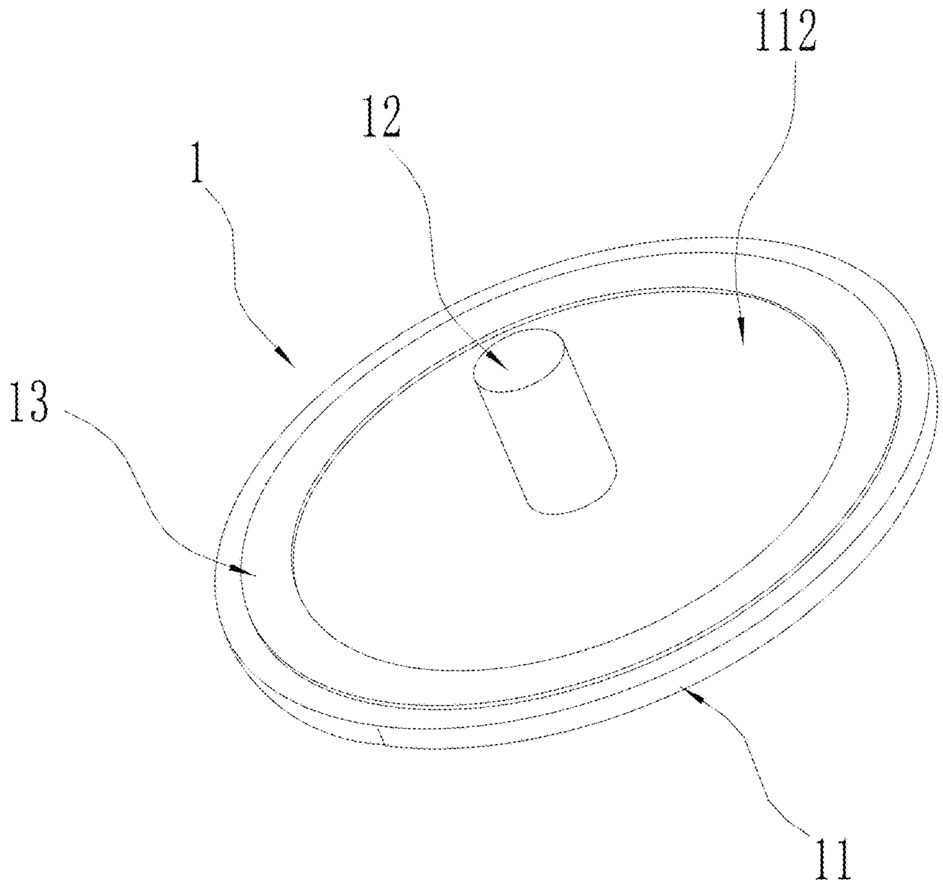
FIG. 4 is a first schematic diagram of an example implementation structure of a light board structure in a perspective view according to Embodiment 2 of the present disclosure.

As shown in FIG. 4, the light board structure 1 of this embodiment is substantially the same as that of embodiment 1, except that, in this embodiment, a separation region is formed between the outer edge of the annular structure of the conductive layer 13 and the outer edge of the second surface 112 of the circuit board 11.

In this embodiment, the creepage distance of the conductive layer 13 is adjusted by controlling the separation distance between the outer edge of the annular structure of the conductive layer 13 and the outer edge of the circuit board 11.

The reference signs not mentioned in the diagram of this embodiment are consistent with the corresponding reference signs in Embodiment 1, and are not described in detail herein.

Embodiment 3

Figure 5:
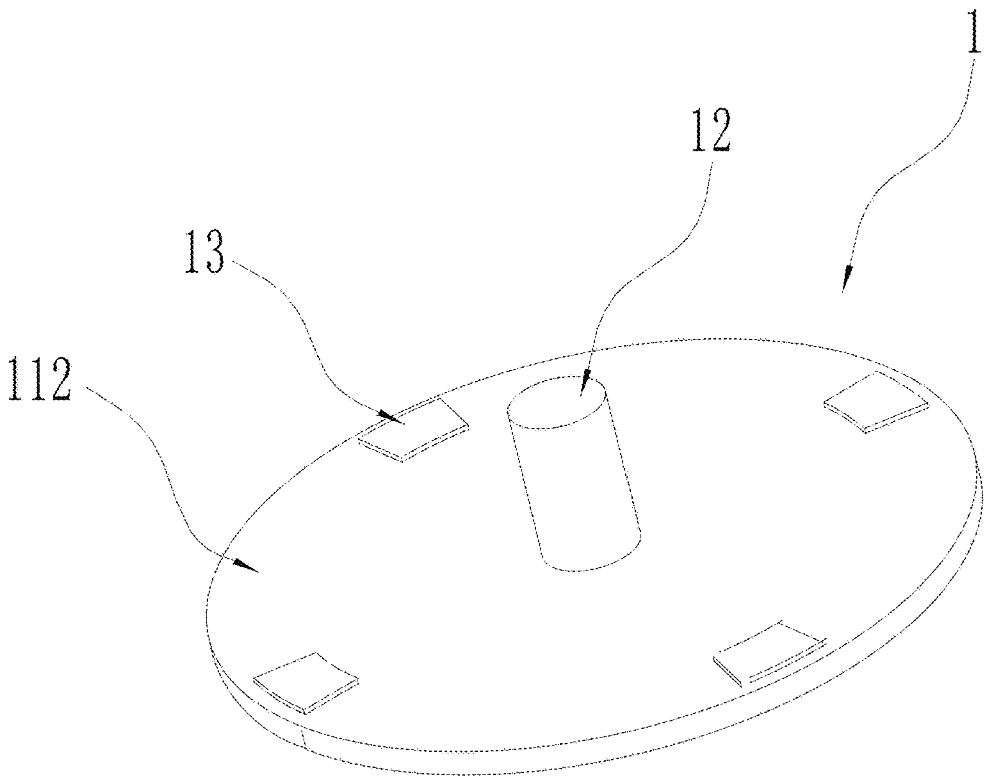
FIG. 5 is a first schematic diagram of an example implementation structure of a light board structure in a perspective view according to Embodiment 3 of the present disclosure.

As shown in FIG. 5, the light board structure 1 of this embodiment is substantially the same as that of the embodiment 1, except that, in this embodiment, the number of the conductive layer 13 is at least one; the conductive layer/s 13 is/are all arranged on the second surface 112 and is/are electrically connected to the second terminal of the light emitting module.

When there are multiple conductive layers 13, the multiple conductive layers 13 are arranged on the second surface 112 in an annular array around the conductive column 12.

In addition to the structure with multiple conductive layers 13 as shown in FIG. 4, when there is only one conductive layer 13, the conductive layer 13 is located on a region of the second surface 112 on one side of the conductive column 12.

Reference signs not mentioned in the diagram of this embodiment are consistent with the corresponding reference signs in embodiment 1, and are not described in detail herein.

Embodiment 4

Figure 6:
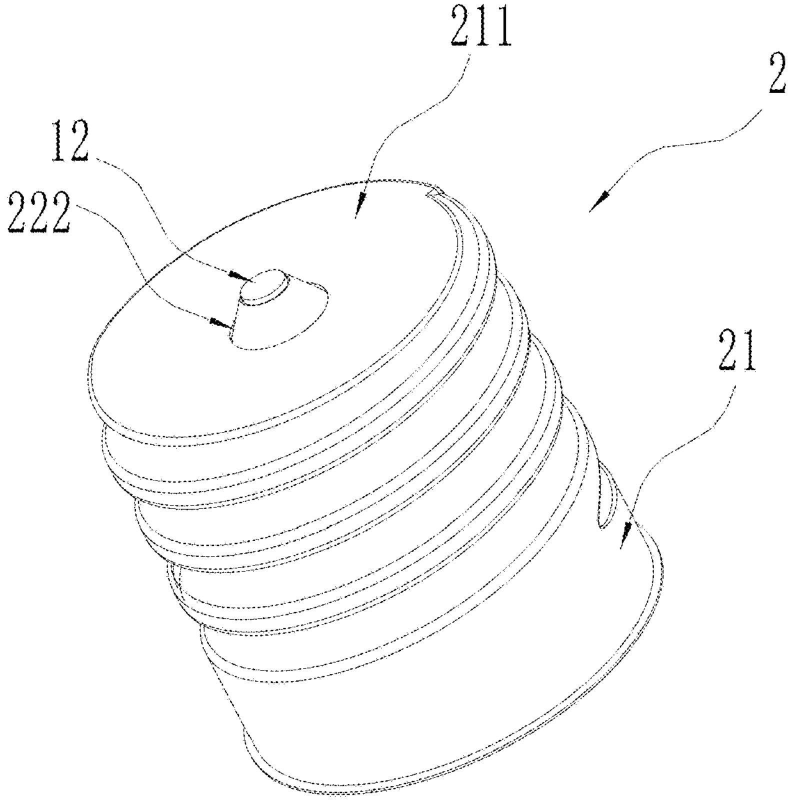
FIG. 6 is a first schematic diagram of an example implementation structure of a light board structure in a perspective view according to Embodiment 4 of the present disclosure.
Figure 7:
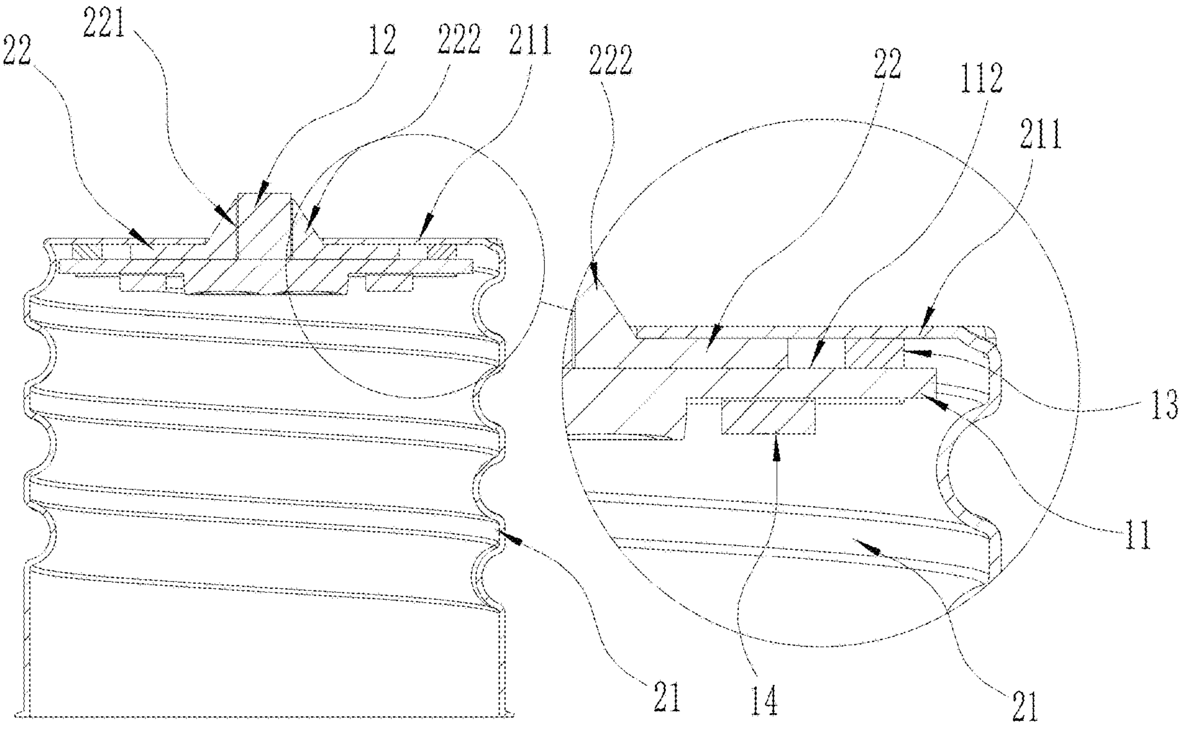
FIG. 7 is a cross-sectional view of the example implementation structure of the bulb cap structure according to Embodiment 4 of the present disclosure.
Figure 8:
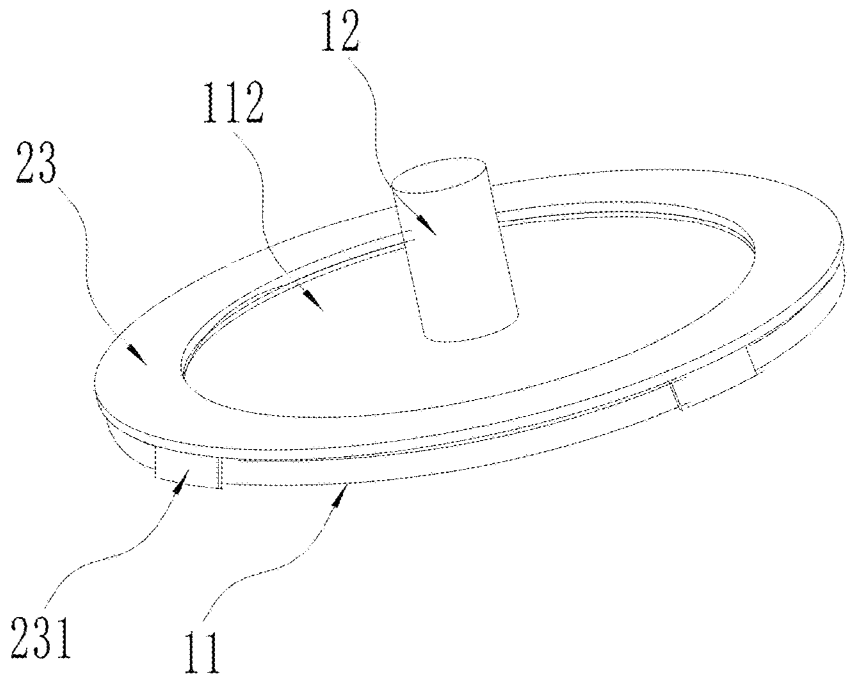
FIG. 8 is a schematic diagram showing the combination of the circuit board and the conductive ring of the bulb cap structure according to Embodiment 5 of the present disclosure.
Figure 9:
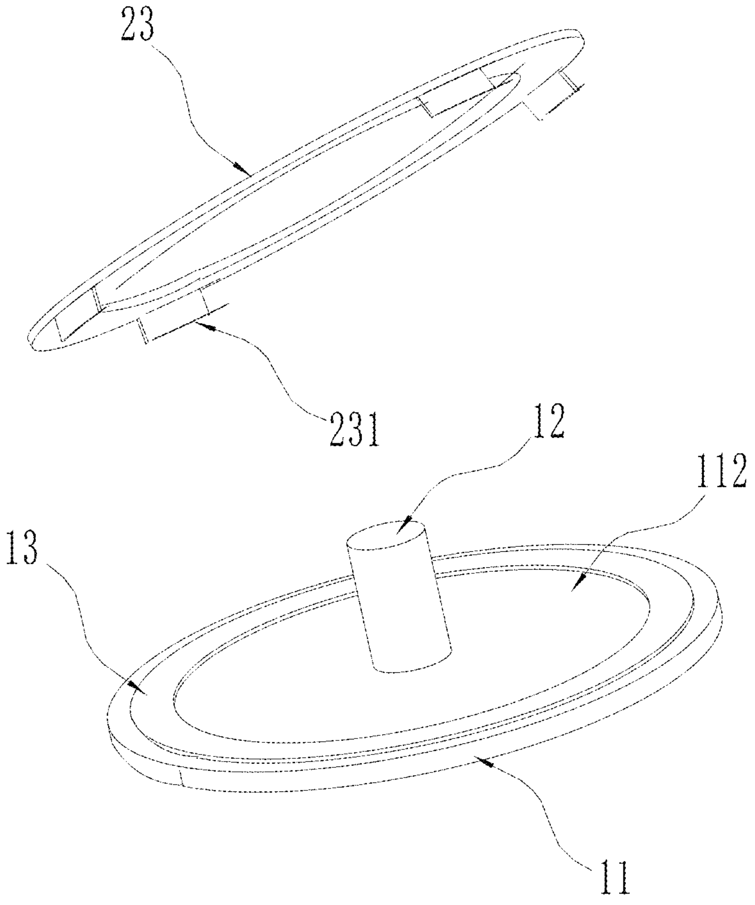
FIG. 9 is a schematic exploded view showing the circuit board and the conductive ring of the bulb cap structure according to Embodiment 5 of the present disclosure.
Figure 10:
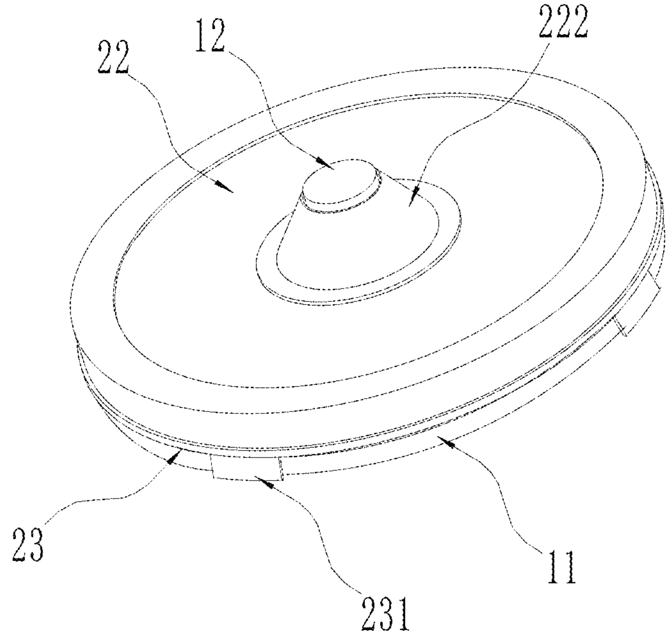
FIG. 10 is a first schematic perspective view showing the combination of the circuit board of the bulb cap structure with the conductive ring and the gasket according to Embodiment 5 of the present disclosure.
Figure 11:
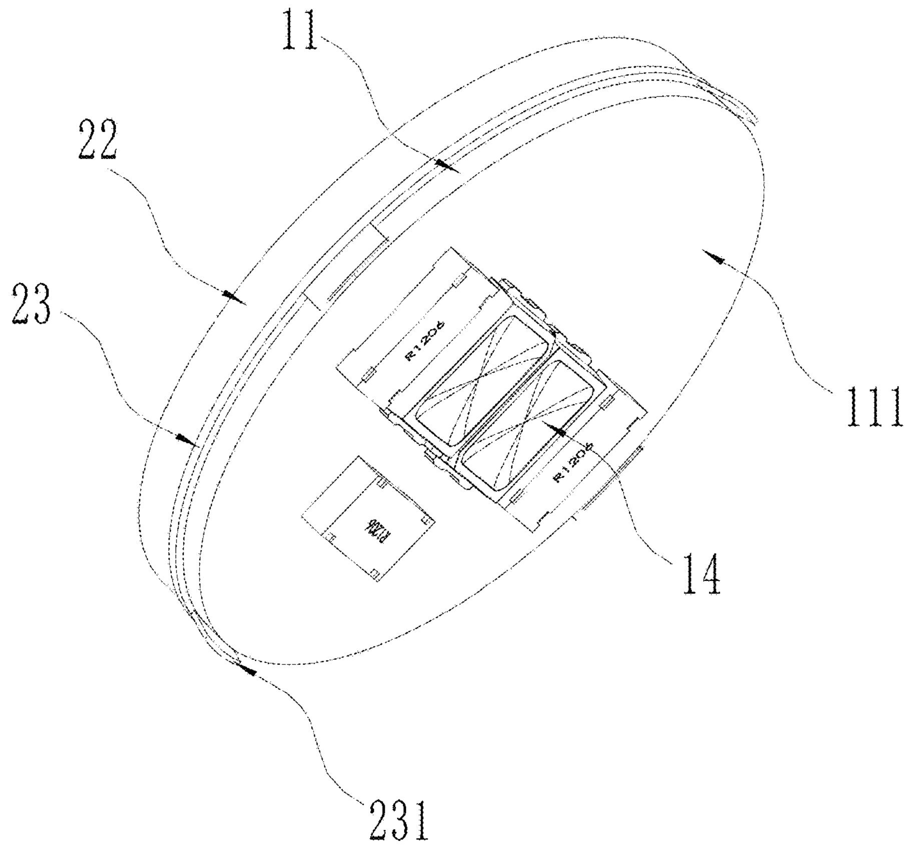
FIG. 11 is a second schematic perspective view showing the combination of the circuit board of the bulb cap structure with the conductive ring and the gasket according to Embodiment 5 of the present disclosure.

As shown in FIG. 6 or FIG. 7, this embodiment further provides a bulb cap 2 based on the light board structure described in the above-mentioned embodiments 1, 2, and 3. The bulb cap 2 may include the light board structure described in the above-mentioned embodiments 1, 2, or 3. In addition, the bulb cap 2 further includes:

- a bulb cap shell 21, wherein the bulb cap shell is a cylindrical shell structure with two ends open, the bulb cap shell 21 is formed of a conductive material and is configured to connect with a socket (i.e., an external holder for mounting the bulb cap), the socket is configured to fix the bulb cap shell 21 and connect to the mains power supply, an end of the bulb cap shell 21 has a contracted structure 211; and
- a gasket 22, wherein the gasket 22 is made of elastic insulating material, an end surface of the gasket 22 is attached to the second surface 112 of the circuit board 11, and the gasket 22 is provided with a through hole 221 corresponding to the conductive column 12.

Among them, based on the above-mentioned structure, during the installation of the circuit board 11 of the light board structure, the circuit board 11 is arranged in the cylindrical structure at one end of the bulb cap shell 21 (namely, in the end with the contracted structure). The other end surface of the gasket 22 is at least partially in contact with the inner wall of the contracted structure 211 of the bulb cap shell 21, and the other end of the conductive column 12 passes through the through hole 221 of the gasket 22 and the contracted structure 211 of the bulb cap shell 21 in sequence.

The other end of the conductive column 12 is located in an exterior of the bulb cap shell 21, the conductive layer 13 on the second surface 112 of the circuit board 11 is in contact with the inner wall of the contracted structure 211 of the bulb cap shell 21, so that the bulb cap shell 21 is indirectly connected to the second terminal of the light-emitting module 14 (when the bulb cap shell 21 is connected to the socket connected to the mains supply, the bulb cap shell 21 connects the neutral line of the mains supply to the light-emitting module 14), and in order to avoid short circuit, the conductive column 12 and the bulb cap shell 211 is separated and insulated to each other.

In the present embodiment, the purpose of using elastic insulating material (such as silicone) for the gasket 22 is to ensure that the light board structure can have a waterproof and moisture-proof function when the light board structure is assembled into the bulb cap shell 21, so as to prevent external water vapor from entering the bulb cap shell 21 through the matching gap between the contracted structure 211 of the bulb cap shell 21 and the circuit board 11. In order to improve the air tightness, the other end surface of the gasket 22 described in the present embodiment is provided with a protrusion 222 corresponding to the contracted structure of the bulb cap shell, and the protrusion 222 partially passes through the contracted structure 211 of the bulb cap shell 21, and the protrusion 222 passes through the through hole 221. On this basis, preferably, the conductive column 12 described in the present embodiment and the through hole 221 are in interference fit.

Based on the above implementation structure, when assembling the light bulb cap 2 of the present embodiment, the operator first needs to attach the gasket 22 to the circuit board 11, and make the conductive column 12 pass through the through hole 221 of the gasket 22, then place the light board structure in the bulb cap shell 21, finally make the protrusion 222 of the gasket 22 and the conductive column 12 pass through the contracted structure 211 of the bulb cap shell 21 to complete the assembly of the light bulb cap 2.

Embodiment 5

Referring to at least one of FIGS. 8-13, this embodiment is substantially the same as embodiment 4, except that, the light bulb cap of this embodiment further includes a conductive ring 23 which is a conductive member (such as an annular thin copper sheet). The conductive ring 23 is arranged on the second surface 112 of the circuit board 11 (the conductive ring is placed or fixed on the second surface 112). The conductive ring 23 is in contact with the conductive layer 13, and at least one conductive sheet 231 extending outward is provided at intervals on the outer peripheral side of the conductive ring 23. The conductive sheet/s 231 is/are configured to be attached with the inner wall of the cylindrical structure of the bulb cap shell 21. In this embodiment, when an annular thin copper sheet is used as the conductive ring 23, since the copper sheet itself has a certain elasticity or deformation ability, therefore, by reasonably setting the extension length of the conductive sheet 231, the conductive sheet 231 can be biased against the inner wall of the bulb cap shell 21 during assembly, so as to maintain contact between the conductive sheet 231 and the bulb cap shell 21, thereby improving electrical stability of the light-emitting module 14 after the bulb cap shell 21 is connected to the mains supply. In order to avoid short circuit, in this embodiment, the conductive ring 231 is separated and insulated from the conductive column 12 on the circuit board 11.

Figure 12:
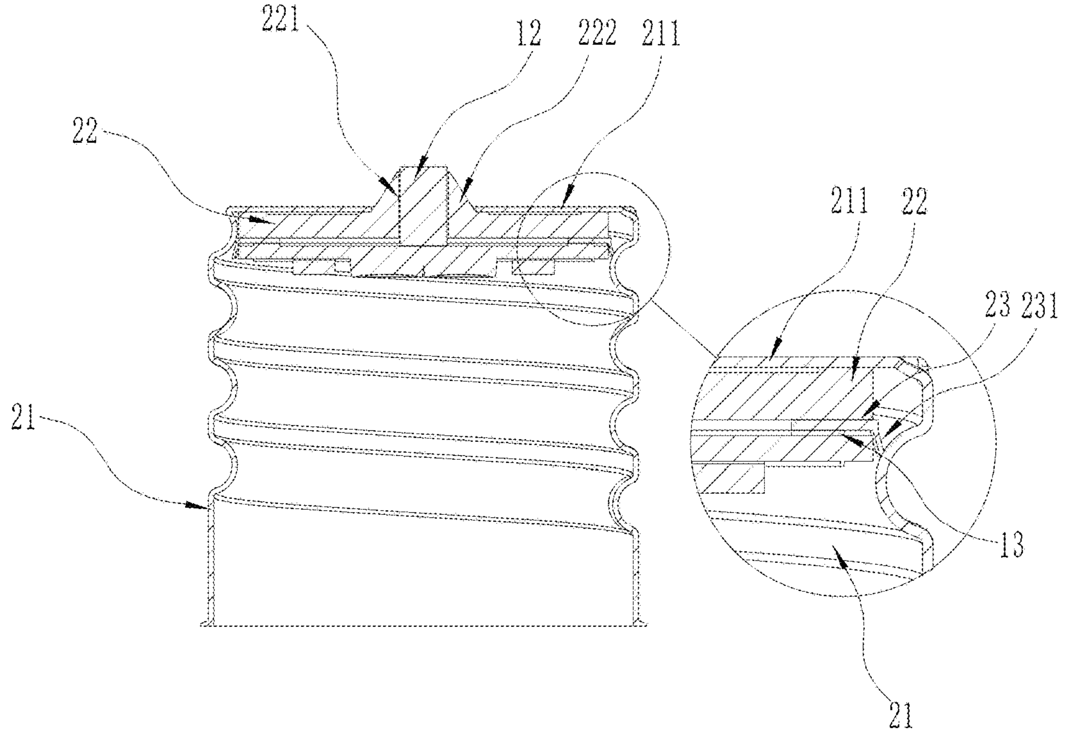
FIG. 12 is a cross-sectional view of an example implementation structure of a bulb cap structure according to Embodiment 5 of the present disclosure.
Figure 13:
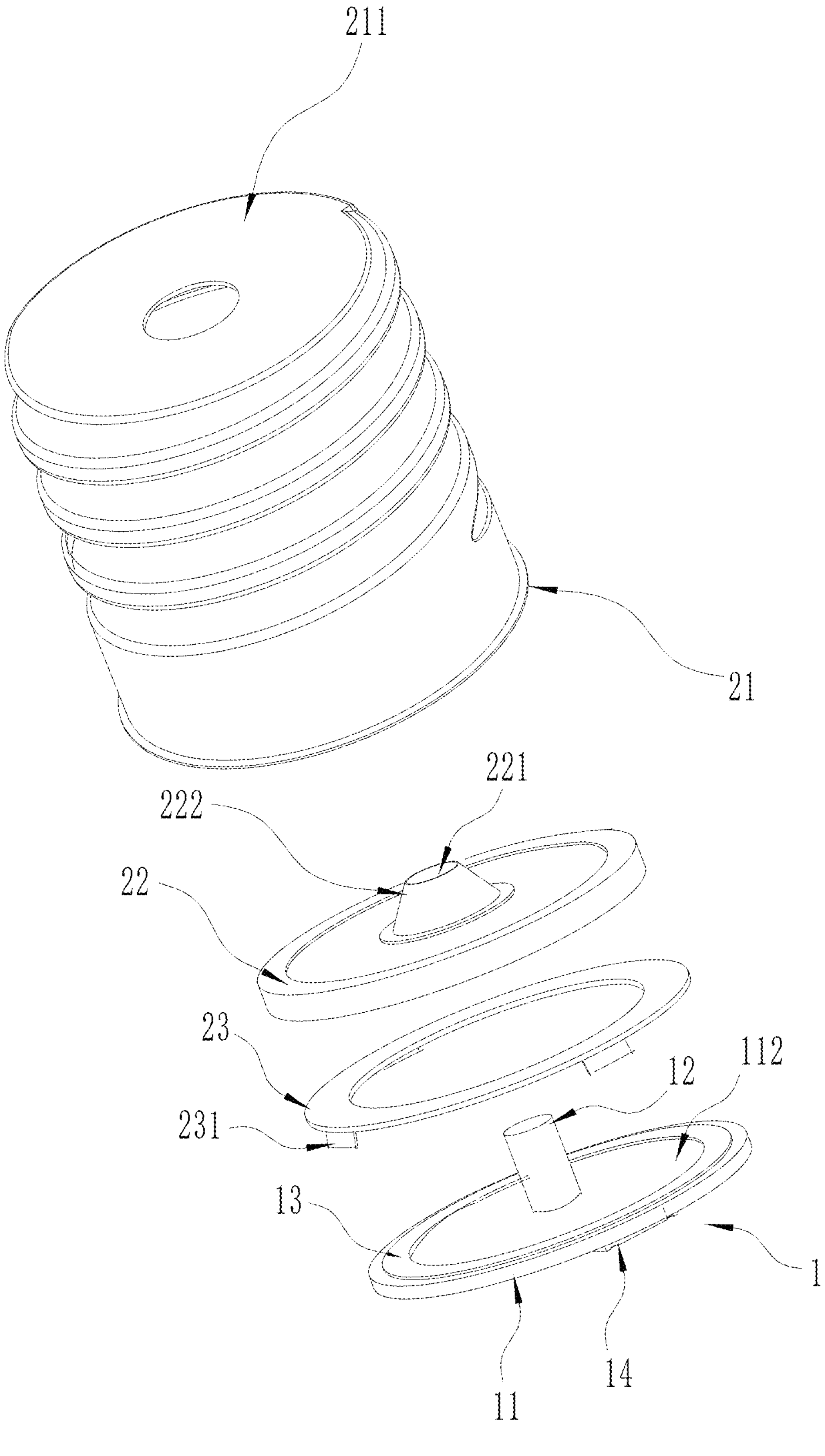
FIG. 13 is an exploded view of the example implementation structure of the bulb cap structure according to Embodiment 5 of the present disclosure.

In this embodiment, the conductive ring 23 is used as a supplementary component to increase the contact reliability between the conductive layer 13 and the bulb cap shell 21. When the light board structure is installed in the bulb cap shell 21, the operator can first attach the conductive ring 23 on the conductive layer 13 on the second surface 112 of the circuit board 11, and assemble the gasket 22 to make the conductive column 12 pass through the through hole of the gasket 22 and place them in the bulb cap shell 21. By configuring the conductive sheet 231 on the conductive ring 23 to be biased and contact with the inner wall of the bulb cap shell 21 (as shown in FIG. 12), the problem of poor contact between the conductive layer 13 on the circuit board 11 and the bulb cap shell 21 caused due to vibration and installation deviation when the circuit board 11 is installed can be avoided.

Compared with the structure of embodiment 4, since the present embodiment uses the conductive ring 23 to supplement the electrical contact, the thickness of the gasket 22 can be flexibly adjusted according to the waterproof requirement of the bulb cap shell 21. In embodiment 4, since the gasket 22 is directly attached to the second surface 112, its conductive layer 13 is also on the second surface 112. Therefore, when the gasket 22 is thicker, it is necessary to increase the thickness of the conductive layer 13 to improve assembly tightness with the bulb cap shell 21.

In order to facilitate waterproof and moisture-proof covering of the circuit board 11, as a preferred embodiment, further, the outer contour of the gasket 22 described in this implementation is adapted to the circuit board 11 of the light board structure, an end surface of the gasket 22 is attached with the second surface 112 of the circuit board 11, and the end surface of the gasket 22 partially covers the conductive ring 23.

Figure 14:
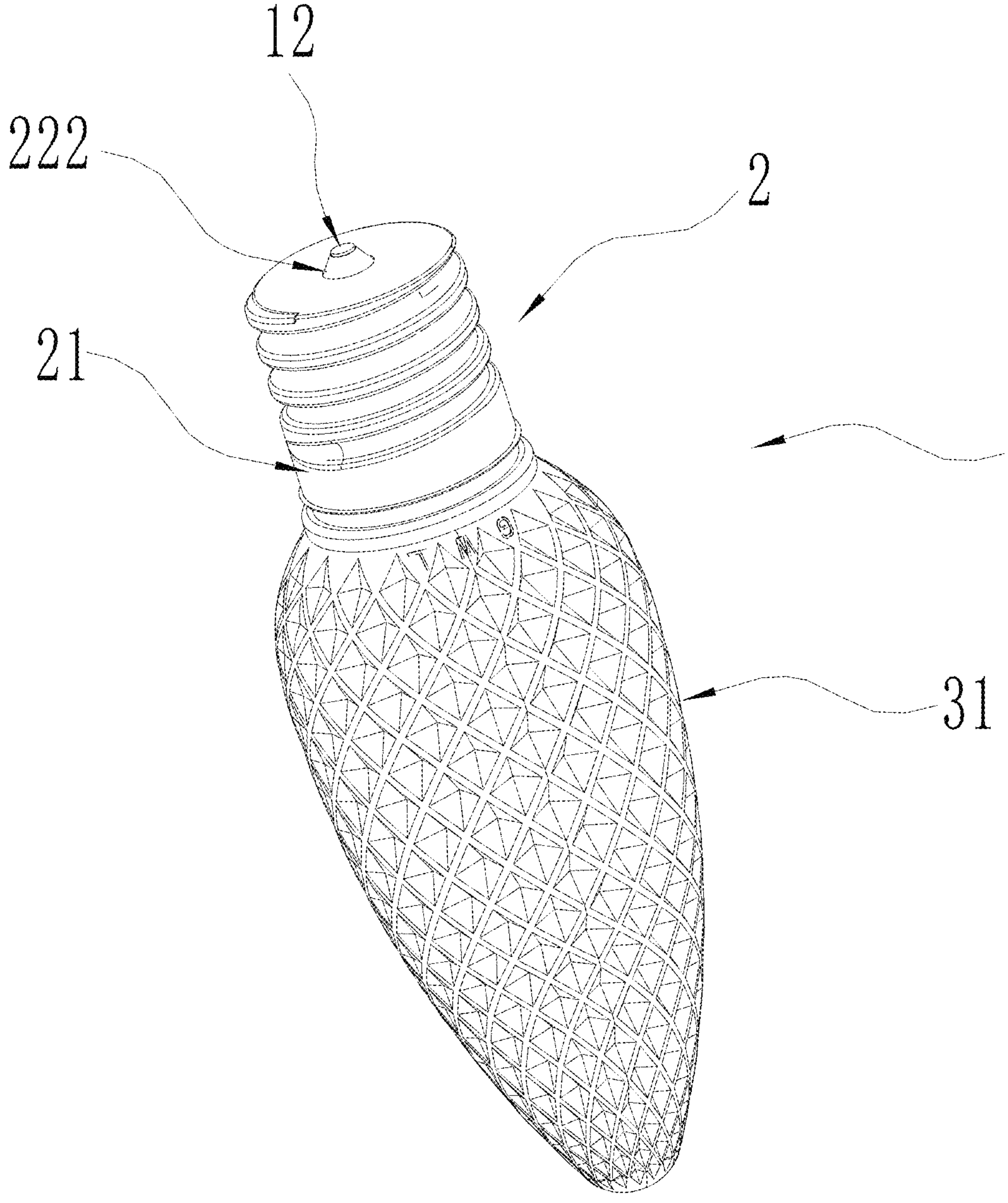
FIG. 14 is a schematic perspective view showing the bulb cap structure according to Embodiment 5 of the present disclosure applied to a light bulb.
Figure 15:
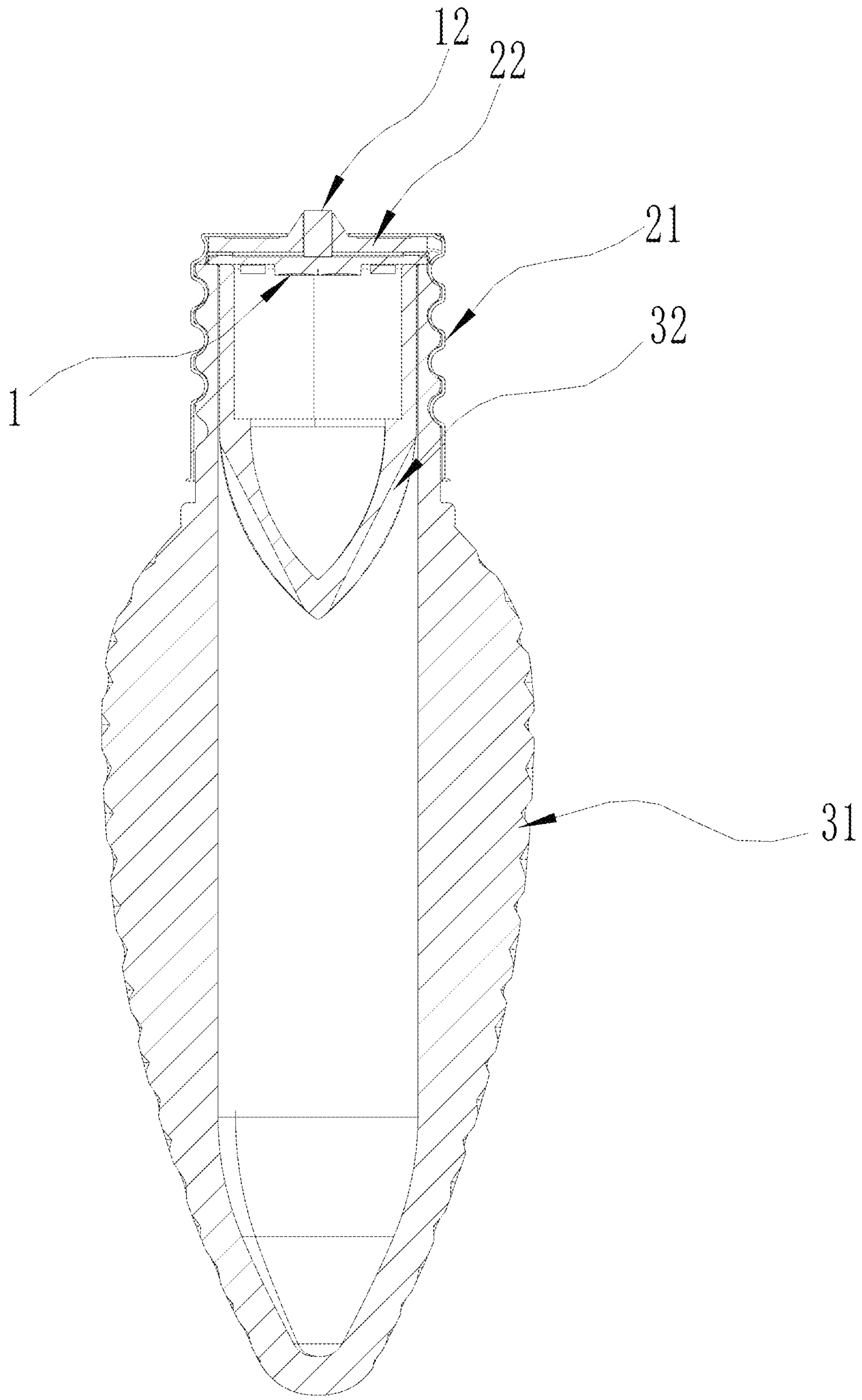
FIG. 15 is a schematic cross-sectional view showing the bulb cap structure according to Embodiment 5 of the present disclosure applied to the light bulb.

On the basis of one of FIGS. 8-13, further combined with FIGS. 14 and 15, a schematic diagram of the implementation of the light bulb cap of this embodiment used in the light 3 is shown, the light 3 also includes a bulb cover 31, the bulb 3 is a hollow structure with one end open, and its open end is connected to the bulb cap shell 21.

In the present embodiment, the bulb cap housing 21 may be a structure provided with threads, and the open end of the bulb 3 may also be provided with threads corresponding to the bulb cap housing 21. By screwing the open end of the bulb cover 31 into the bulb cap housing 21 through the threads, the open end of the bulb cover 31 further constrains and fixes the light board structure 1 in the bulb cap housing 21, thereby facilitating the assembly of the light bulb 3. The installed light bulb 3 is mounted on the socket, and then connected to the power supply to be lighted up.

In order to improve the uniformity of the light from the light emitting module 14, a lens 32 may be further installed in the light bulb 3.

Embodiment 6

Figure 16:
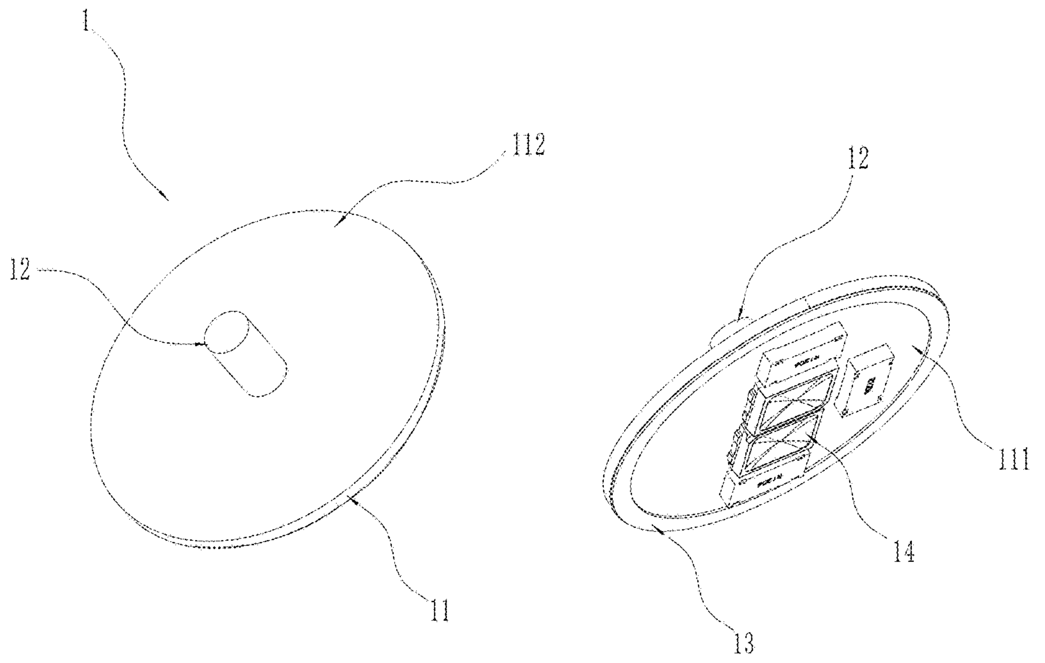
FIG. 16 is a first schematic perspective view of an example implementation structure of a light board structure according to Embodiment 6 of the present disclosure.

As shown in FIG. 16, this embodiment discloses an implementation of a light board structure 1 different from that of embodiment 1. The main difference between the the present embodiment and embodiment 1 is that the conductive layer 13 is arranged at different positions. The light board structure 1 of this embodiment also includes a circuit board 11, a conductive column 12, a conductive layer 13, and a light-emitting module 14. In this embodiment, the conductive layer 13 is arranged on the first surface 111 of the circuit board 11, wherein the conductive layer 13 has an annular form, and the outer edge of the conductive layer 13 extends to the outer edge of the first surface 111 of the circuit board 11.

In this embodiment, an end of the conductive column 12 of the light board structure 1 is fixed to the middle part of the second surface 112 of the circuit board 11 and is connected to the first terminal 141 of the light emitting module 14; the conductive layer 13 is connected to the second terminal 142 of the light emitting module 14.

Figure 17:
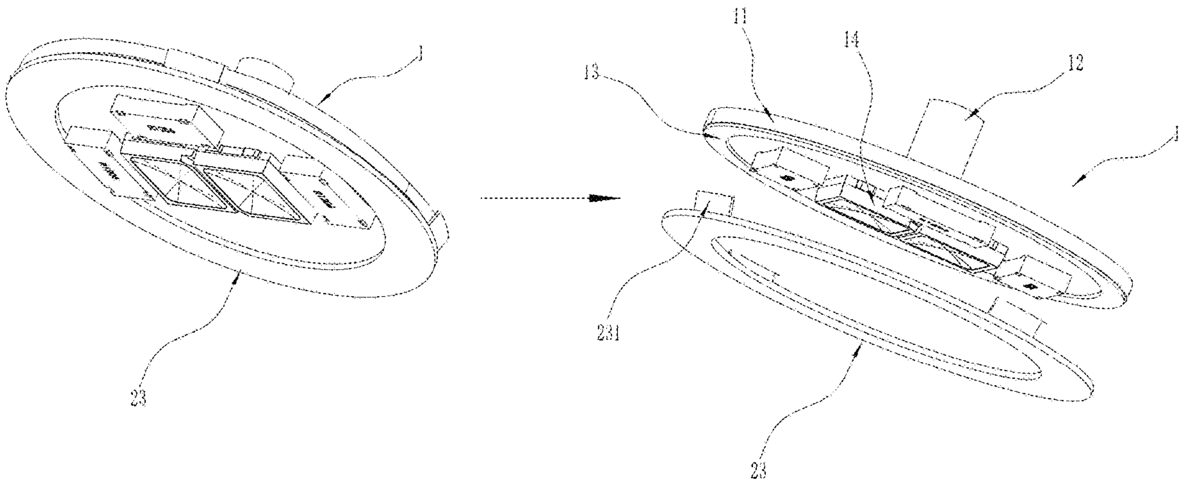
FIG. 17 is a schematic diagram showing the combination of the light board structure according to Embodiment 6 of the present disclosure and the conductive ring when the light board structure is installed in the bulb cap shell.
Figure 18:
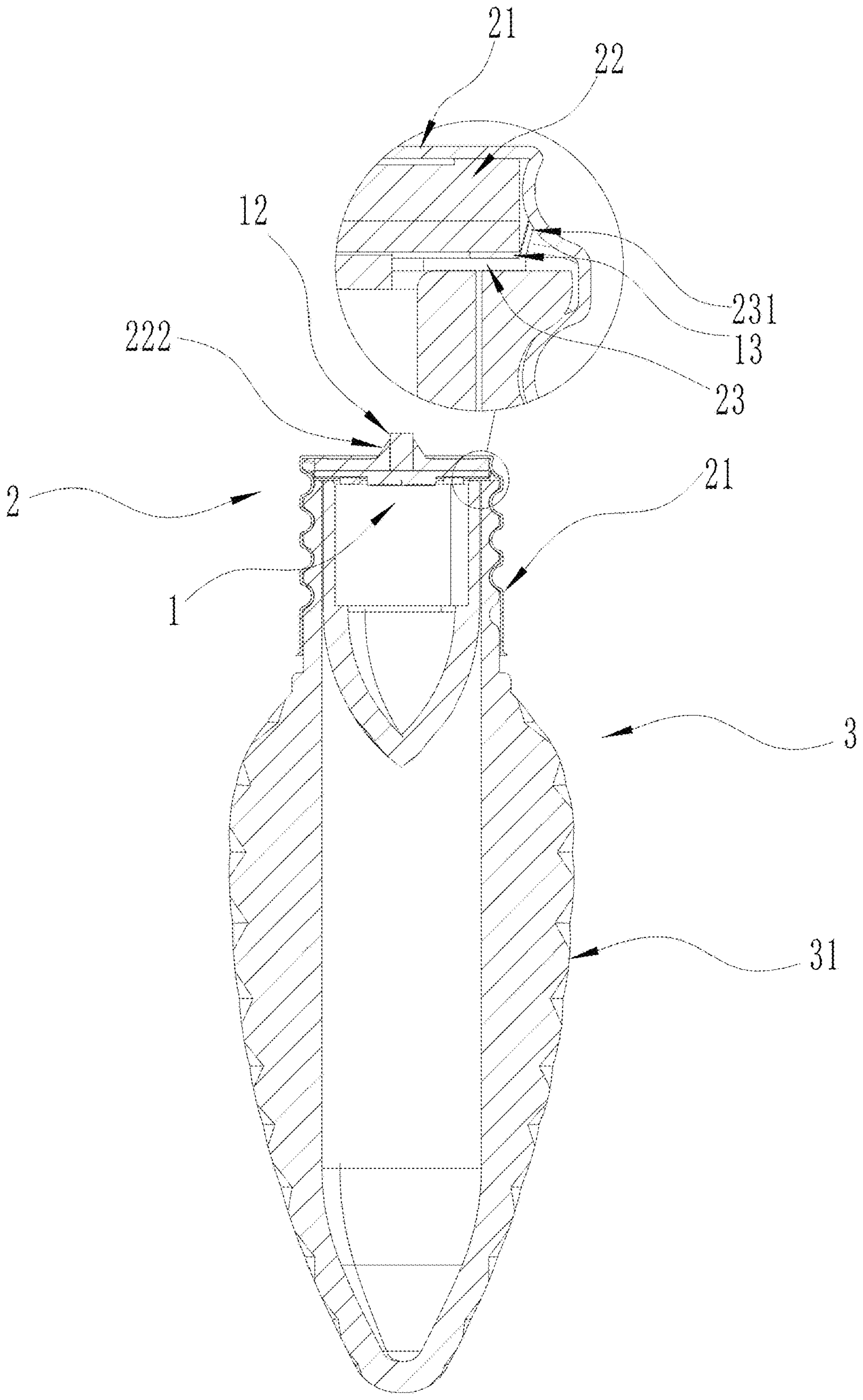
FIG. 18 is a schematic diagram showing the light board structure according to Embodiment 6 of the present disclosure being installed on the light bulb.

Further, combined with what is shown in FIGS. 17 and 18, when the light board structure 1 of this embodiment is assembled in the bulb cap shell 21 of the bulb cap 2 as one of the components, the light board structure 1 and the bulb cap shell 21 may also be combined through the conductive ring 23 as the implementation structure shown in embodiment 5, so as to improve the contact reliability between the conductive layer 13 and the bulb cap shell 21. The difference between embodiment 5 and this embodiment is that when the conductive layer 13 is arranged on the first surface 111 of the circuit board 11, the conductive ring 23 is attached to the first surface 111.

The similarity between embodiment 5 and this embodiment is that the bulb cap 2 is further attached with the second surface 112 of the light board structure 1 via a gasket 22, and the conductive column 12 passes through the through hole on the protrusion 222 of the gasket 22 and is exposed outside the contracted structure of the bulb cap shell 21.

The restriction and fixation of the conductive ring 23 and the circuit board 11 can be achieved by screwing the bulb cover 31 into the light bulb shell 21. By screwing and installing the open end of the bulb cover 31 into the bulb cap shell 21 until the open end of the bulb cover 31 being biased against the conductive ring 23 and the circuit board 11, the circuit board 11 of light bulb structure 1 and the conductive ring 23 are further restricted and fixed in the light bulb shell 21, so as to achieve the fixation and installation. In addition, the circuit board 11 and the conductive ring 23 of the light board structure 1 can also be fixed in the bulb cap shell 21 by glue dispensing.

Reference numerals not mentioned in the drawings of this embodiment are consistent with the corresponding reference numerals in embodiment 4, and are not repeated herein.

Embodiment 7

Figure 19:
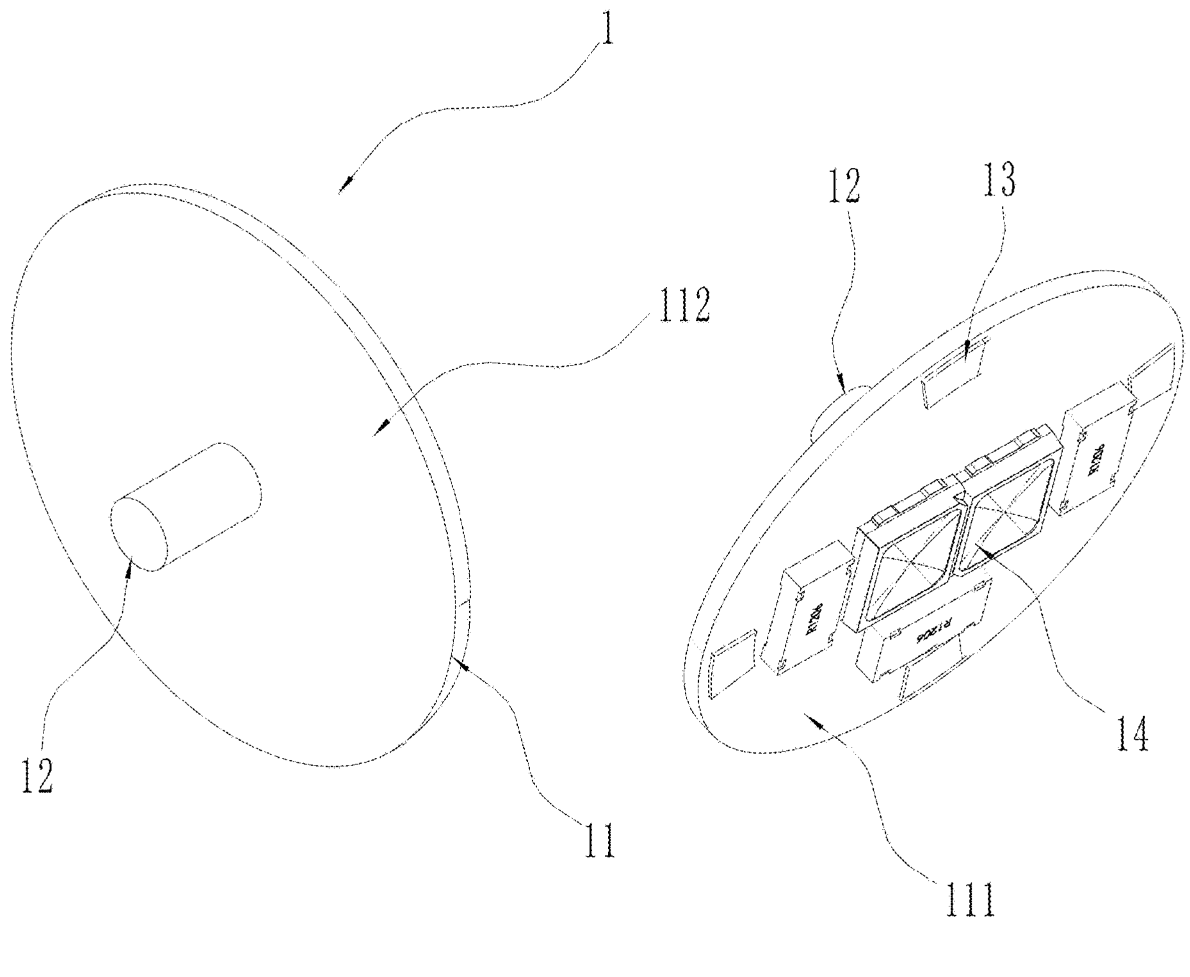
FIG. 19 is a schematic perspective view of an example implementation structure of the light board structure according to Embodiment 7 of the present disclosure.

As shown in FIG. 19, the light board structure 1 of this embodiment is substantially the same as embodiment 6, except that the conductive layer 13 of the light board structure 1 of this embodiment is different from that of embodiment 6. The number of the conductive layer 13 is at least one, and the at least one conductive layer 13 is/are all arranged on the first surface 111 of the circuit board 1 and is/are electrically connected to the second terminal of the light-emitting module 14.

Reference numerals not mentioned in the drawings of this embodiment are consistent with the corresponding reference numerals in embodiment 6, and are not repeated herein.

Embodiment 8

Figure 20:
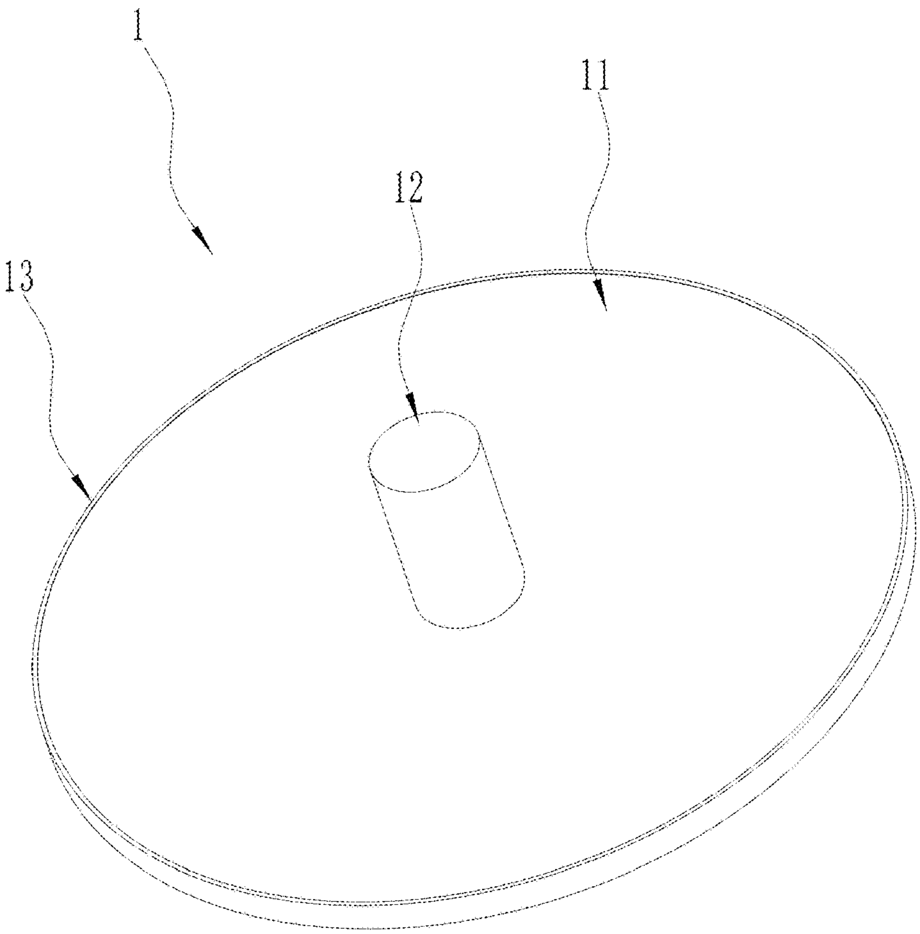
FIG. 20 is a schematic perspective view of an example implementation structure of the light board structure according to Embodiment 8 of the present disclosure.

As shown in FIG. 20, the light board structure 1 of this embodiment is substantially the same as embodiment 6, except that the conductive layer 13 of the light board structure 1 of this embodiment is different from that of embodiment 6. The conductive layer 13 of the light board structure 1 of this embodiment surrounds the outer periphery of the circuit board 11 and is electrically connected to the second terminal of the light emitting module 14.

Similarly, the conductive column 12 of the light board structure 1 of this embodiment is also arranged in the middle part of the second surface of the circuit board 11 and is electrically connected to the first terminal of the light emitting module 14.

Embodiment 9

Figure 21:
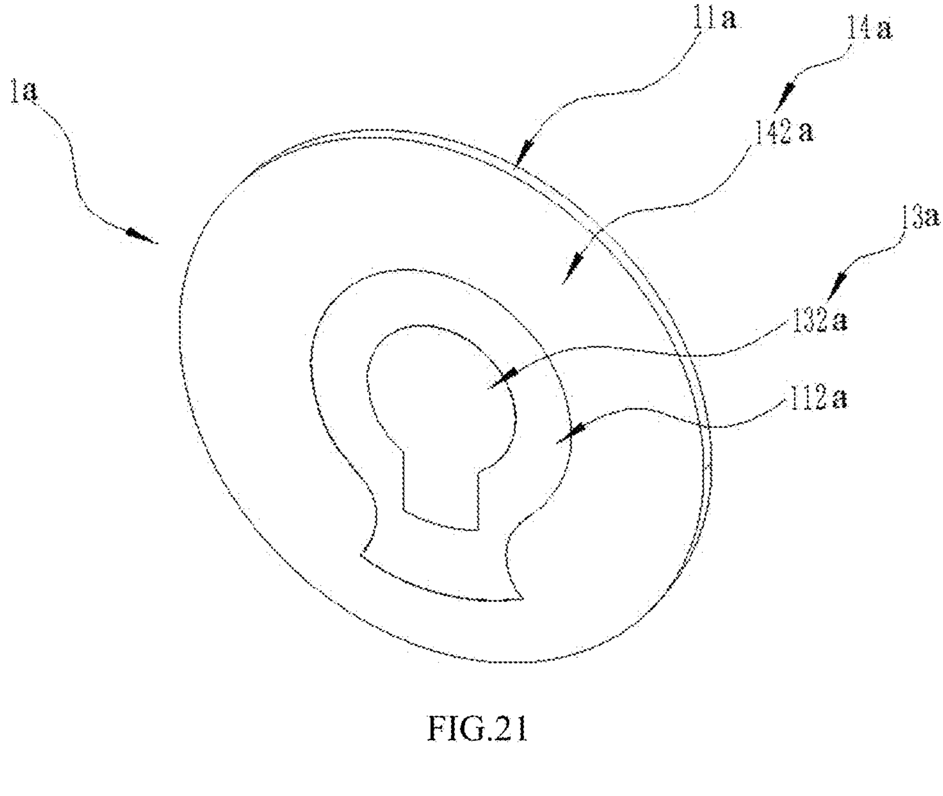
FIG. 21 is a perspective view showing a first implementation structure of the light board structure according to Embodiment 9 of the present disclosure.
Figure 24:
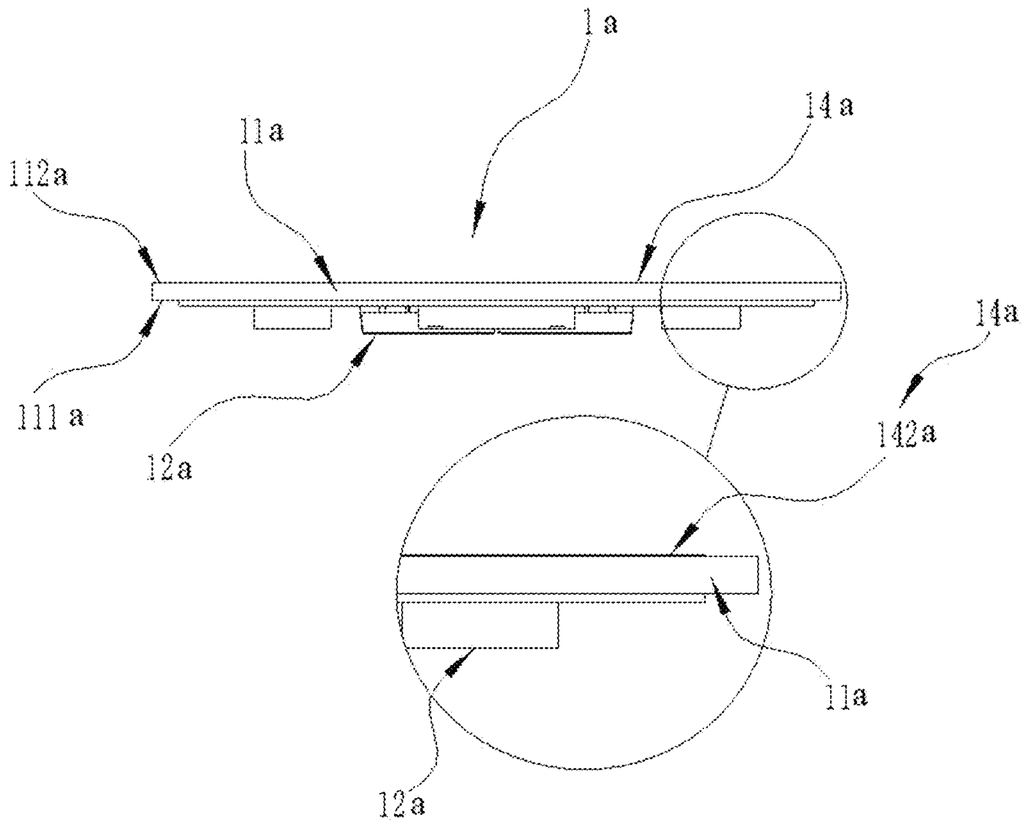
FIG. 24 is a perspective view showing a third implementation structure of the light board structure according to Embodiment 9 of the present disclosure.
Figure 25:
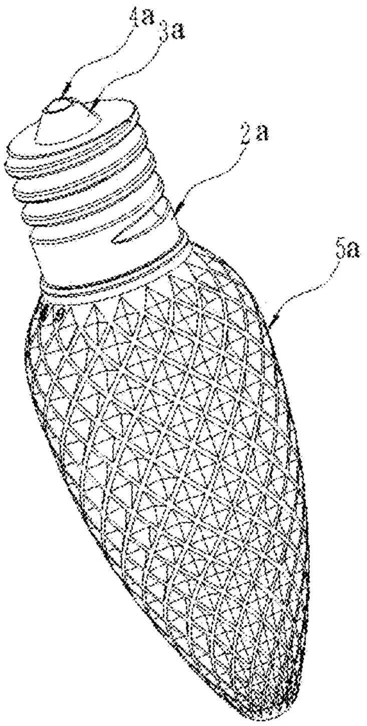
FIG. 25 is a schematic perspective view showing the light board structure according to Embodiment 9 of the present disclosure applied on a light bulb.
Figure 26:
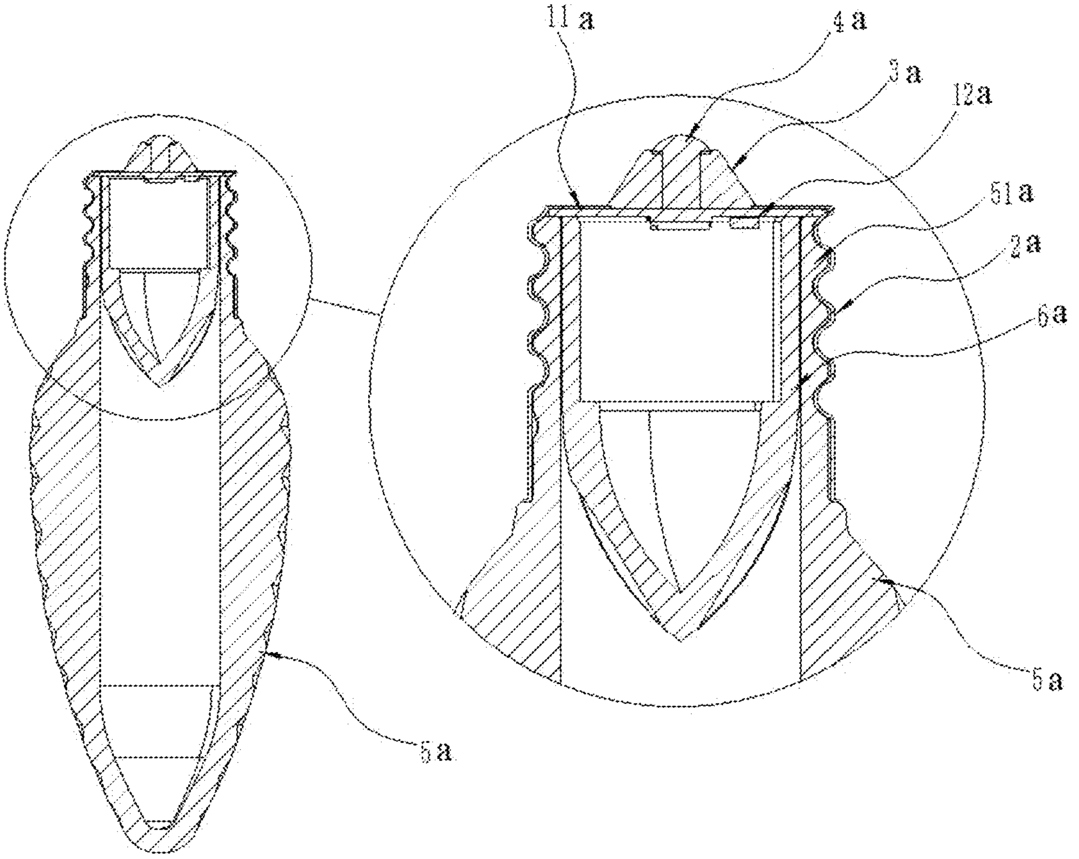
FIG. 26 is a cross-sectional view of the light board structure according to Embodiment 9 of the present disclosure applied on a light bulb.
Figure 27:
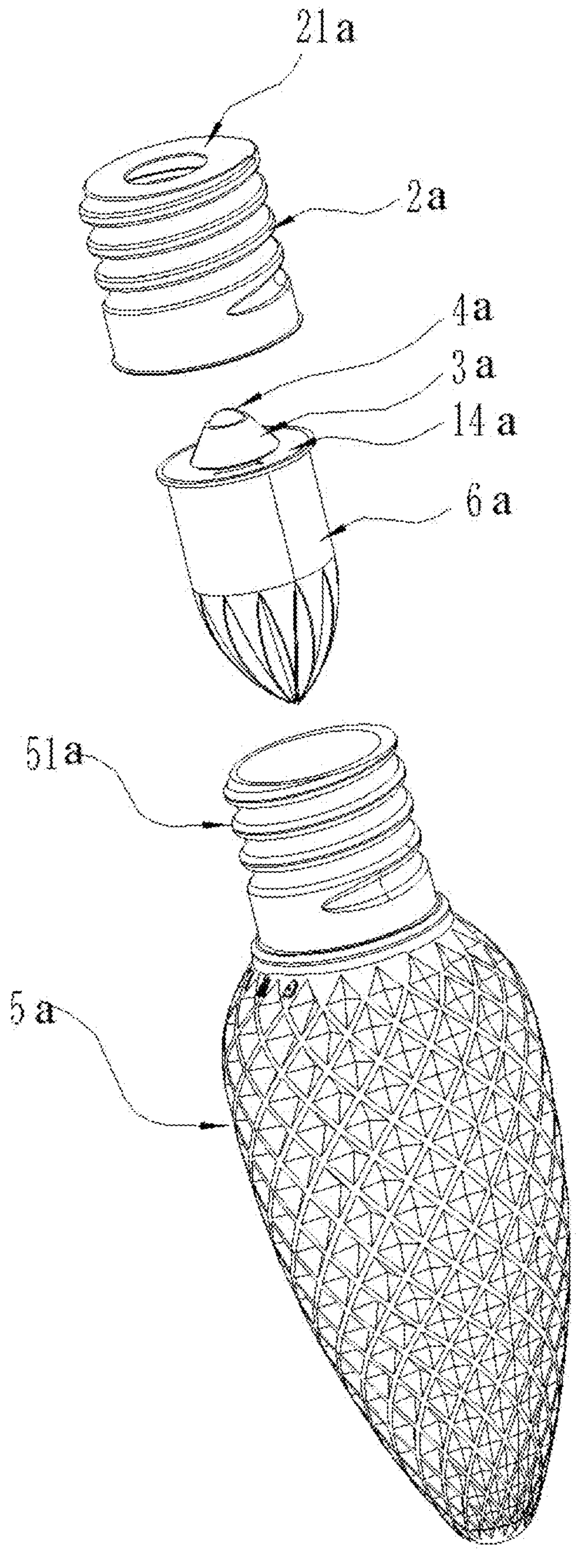
FIG. 27 is an exploded view of the light board structure according to Embodiment 9 of the present disclosure applied on a light bulb, wherein the diagram mainly shows the installation of the second implementation structure of the light board structure of Embodiment 9.

As shown in FIG. 21 and FIG. 24, the light board structure 1 of the present embodiment includes a circuit board 11*a*, a light-emitting module 12*a*, a first conductive member 13*a* and a second conductive member 14*a*, the circuit board 11*a* has a first surface 111*a* and a second surface 112*a* opposite to each other, the light-emitting module 12*a* is arranged on the first surface 111*a*, and the first conductive member 13*a* and the second conductive member 14*a* are both arranged on the second surface 112*a* of the circuit board 11*a* and are not in contact with each other.

In the present embodiment, the light emitting module 12*a* is an LED light emitting module. The light emitting module 12*a* is powered by the mains supply. Meanwhile, the light emitting module 12*a* of the present embodiment is electrically connected to the first conductive member 13*a* and the second conductive member 14*a* in the same manner, namely, the light emitting module 12*a* has a first terminal 121*a* and a second terminal 122*a* for connecting to the power supply, and the first terminal 121*a* is connected to the first conductive member 13*a*, and the second terminal 122*a* is connected to the second conductive member 14*a*.

Referring to FIG. 21, as one of the implementation examples of the first conductive member 13*a* and the second conductive member 14*a* of the present embodiment, in the present embodiment, the first conductive member 13*a* includes a first conductive layer 132*a* arranged in the middle part of the second surface 112*a*, and the second conductive member 14*a* includes a second conductive layer 142*a* arranged on the second surface 112*a* and surrounding the first conductive layer 132*a*. Specifically, the first conductive layer 132*a* is configured to connect to the live wire L of the mains supply, and the second conductive layer 141*a* is configured to connect to the neutral wire N of the mains supply.

In addition, referring to FIG. 21, in this embodiment, the first conductive layer 132*a* may be connected to the first terminal 121*a* of the light emitting module 12*a* through a conductive wire, and the second conductive layer 142*a* may also be connected to the second terminal 122*a* of the light emitting module 12*a* through a conductive wire. The conductive wires may be printed wires printed on the circuit board 11*a*, or may be common wires not printed on the circuit board 11*a*. When the conductive wires are common wires, the circuit board 11*a* may be provided with through holes or conductive holes corresponding to the first conductive layer 131*a* and the second conductive layer 141*a* for the wires to pass through the circuit board 11*a* and connect with the first terminal 121*a* and the second terminal 122*a* of the light emitting module 12. The circuit board 11*a* may also be provided with conductive holes that extend through the circuit board 11*a* to electrically connect the first conductive layer 132*a* and the second conductive layer 142*a* to the light emitting module 12*a*. The configuration of through holes and wire passing through the through holes or the configuration of conductive holes belongs to a common form of electrical connection layout of the circuit board, so the details are not repeated herein.

In the implementation shown in FIG. 21, on the second surface 112*a* of the circuit board 11*a*, the remaining area except for the positions where the first conductive layer 132*a* and the second conductive layer 142*a* are arranged is an electrically insulating area, so as to avoid electrical connection between the first conductive layer 132*a* and the second conductive layer 142*a*, thereby preventing the light-emitting module from being electrically short-circuited. The outer edge of the second conductive layer 141*a* extends to the outer edge of the circuit board 11*a*.

Figure 22:
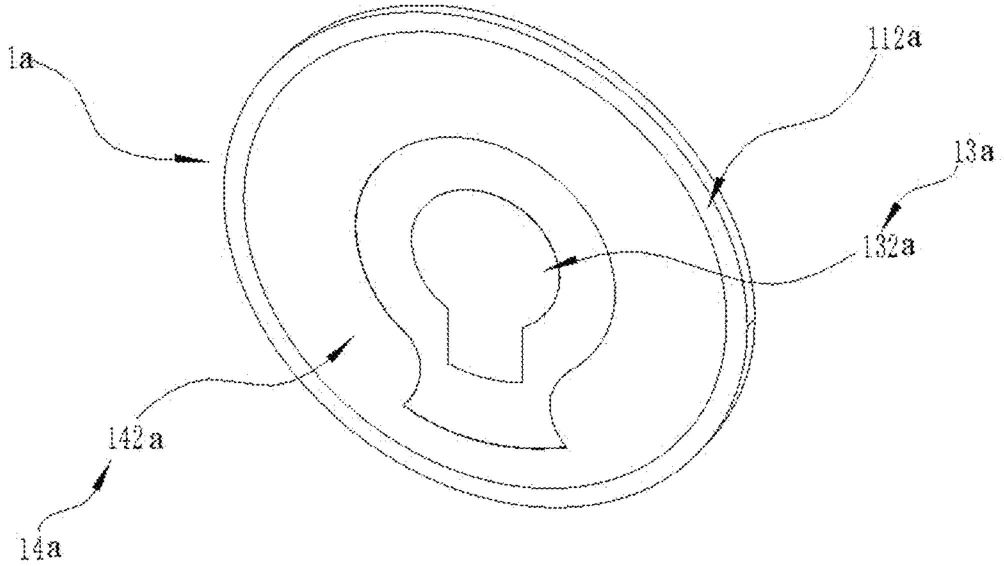
FIG. 22 is a perspective view showing the side of the first implementation structure of the light board structure according to Embodiment 9 of the present disclosure.

Since the light board structure of the present embodiment is arranged in a light bulb for use, in order to improve safety, FIG. 22 shows another implementation structure of the present embodiment, in which the electrical safety of the circuit board is achieved by adjusting the creepage distance between the second conductive layer 142*a* of the second conductive member 14*a* and the outer edge of the circuit board 11*a*. Optionally, a predetermined separation space may be provided between the outer edge of the second conductive layer 142*a* and the outer edge of the circuit board 11*a*, namely, the outer edge of the second conductive layer 142*a* does not extend to the outer edge of the circuit board 11*a*. Similarly, in order to facilitate the adjustment of the creepage distance between the first conductive layer 132*a* of the first conductive member 13*a* and the second conductive layer 142*a* of the second conductive member 14*a*, in the present implementation, the creepage distance may also be adjusted by adjusting the separation distance between the first conductive layer 132*a* and the second conductive layer 142*a*.

Figure 23:
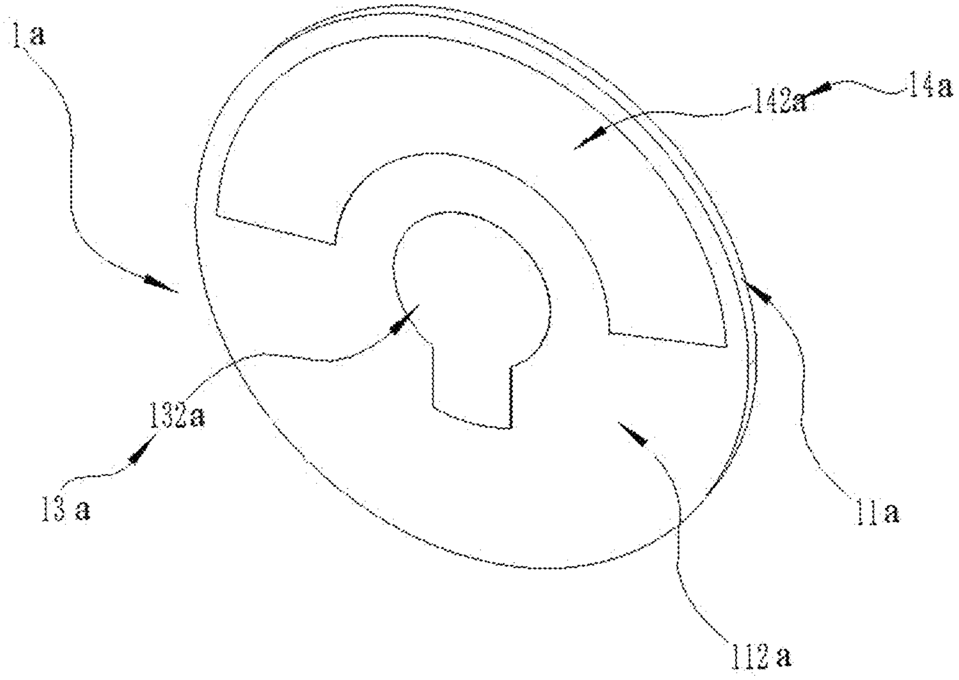
FIG. 23 is a perspective view showing a second implementation structure of the light board structure according to Embodiment 9 of the present disclosure.

In addition to the above-mentioned implementation structure of the second conductive layer 142*a* being an annular closed structure (see FIGS. 21 and 22), in combination with FIG. 23, in this embodiment, the implementation structure of the second conductive layer 142*a* on the second surface 112*a* of the circuit board 11*a* is not limited thereto, and the second conductive layer 141*a* may also be a non-annular closed structure, for example, a semi-annular structure with open ends or a fan-shaped structure; similarly, the remaining area on the second surface 112*a* of the circuit board 11*a* corresponding to the first conductive layer 132*a* and the second conductive layer 142*a* is an electrically insulating area. The electrically insulating area may also be an insulating structure directly formed as one piece with the body of the circuit board 11*a*, or be a separated insulating layer structure combined with the circuit board 11*a*, the purpose of the electrically insulating area is to avoid short circuit of the light-emitting module 12*a* caused by direct contact between the first conductive layer 132*a* and the second conductive layer 142*a*.

Based on the three implementation structures shown in FIGS. 21 22 and 23 mentioned above in this embodiment, further combined with one of FIGS. 24 to 27, a schematic diagram in which a light board structure is applied in a light bulb is shown. Specifically, in this embodiment, the first conductive member 13*a* is in the form of a conductive layer. In this case, when the circuit board 11*a* is applied in a light bulb, a conductive column needs to be installed thereon to connect to the live wire of the mains supply.

This embodiment also provides a light bulb, which can be applied with the light board structure 1*a* described in FIG. 21, FIG. 22 or FIG. 23. In addition to the light board structure 1*a*, in combination with any one of FIG. 24 to FIG. 27, the light bulb further includes:

a bulb cap shell 2*a*, wherein the bulb cap shell 2*a* is a cylindrical shell structure with two open ends and is formed of a conductive material, the bulb cap shell 2*a* is configured to connect with a socket (i.e., an external holder that is fitted with the bulb cap shell 2*a*, and the external holder and the bulb cap shell collectively constitute a part of the lighting fixture), an end of the bulb cap shell 2*a* has a contracted structure 21*a*, and the circuit board 11*a* of the light board structure 1*a* is fixedly arranged in the cylindrical structure of the bulb cap shell 2*a*, the second conductive layer 142*a* on the second surface 112*a* of the circuit board 11*a* is in contact with the inner sidewall of the contracted structure 21*a* of the bulb cap shell 2*a*, and the first conductive layer 132*a* on the second surface 112*a* of the circuit board 11*a* is not in contact with the bulb cap shell 2*a;* a connection member 3*a*, wherein the connection member 3*a* is made of an insulating material and is arranged on the contracted structure 21*a* of the bulb cap shell 2*a*, a through hole 31*a* extending through towards both ends of the connection member 3*a* is provided in the middle of the connection member 3*a*, the through hole 31*a* is opposite to the first conductive layer 132*a* on the second surface 112*a* of the circuit board 11*a;* a conductive column 4*a*, wherein an end of the conductive column 4*a* passes through the through hole 31*a* of the connection member 3*a* and contacts the first conductive layer 132*a* on the second surface 112*a* of the circuit board 11*a*; and a bulb cover 5*a*, wherein the bulb cover 5*a* is a hollow structure with one end open, and the open end is connected to the bulb cap shell 2*a*.

In use, after the light bulb is installed in the external holder/socket, the main body of the bulb cap shell 2*a* is connected to the neutral line N of the mains supply, and the conductive column 4*a* inserted through the connection member 3*a* on the bulb cap shell 2*a* is configured to connect to the live line L of the mains supply; thereby achieving the effect of connecting the mains supply to the light-emitting module 12*a*.

In order to improve the illumination controllability or light concentration property of the light emitting module 12*a*, as a preferred implementation option, preferably, the light bulb of this implementation may further include an inner lens 6*a*, an end of inner lens 6*a* is arranged in the bulb cover 5*a*, and the other end of the inner lens 6*a* is fixedly arranged on the first surface 111*a* of the circuit board 11*a*, and the light emitting module 12*a* is covered therein.

In the present implementation, one of the functions of the connection member 3*a* is to separate the conductive column 4*a* and the bulb cap shell 2*a* to prevent contact therebetween after being powered on and avoiding short circuit in the light-emitting module 12*a*. In addition, since the light bulb may generate heat during work, in order to prevent external humid air from entering the bulb cover 5*a* and causing damage to the light-emitting module 12*a* or other abnormalities, it is very necessary to improve the connection reliability and tightness of the connection member 3*a*. At the same time, in order to facilitate installation, as a preferred implementation option, preferably, an end of the connection member 3*a* in the present implementation may be attached to the second surface 112*a* of the circuit board 11*a*, and after the connection member 3*a* is installed in the bulb cap shell 2*a*, the other end of the connection member 3*a* passes through the contracted structure 21*a* of the bulb cap shell 2*a* and is exposed outside the bulb cap shell 2*a*. The shape and contour of the connection member 3*a* may also be configured as a shape of frustum, and the end of the frustum with a larger area is in contact with the second surface 112*a* of the circuit board 11*a*.

The arrangement of the connection member 3_a_ in the present implementation is not be limited to the above-mentioned forms, and the connection member 3_a_ may be directly molded on the contracted structure 21_a_ of the bulb cap shell 2_a_ by injection molding, namely, the connection member 3_a_ may be directly molded on the metal part by an injection molding process, thereby being free from the subsequent process of separately installing the connection member 3_a_.

In order to improve the tightness of the connection between the bulb cover 5_a_ and the bulb cap shell 2_a_, as a preferred implementation option, preferably, the inner wall of the bulb cap shell 2_a_ described in this implementation is provided with internal threads, and the open end of the bulb cover 5_a_ is provided with external threads 51_a_ corresponding to the internal threads. The open end of the bulb cover 5_a_ is screwed into the bulb cap shell 2_a_ through the external threads for fixation, and the circuit board 11_a_ of the light board structure 1_a_ is restricted and fixed between the contracted structure 21_a_ of the bulb cap shell 2_a_ and the open end of the bulb cover 5_a_.

By adopting the above-mentioned structure, when assembling the light bulb of the present implementation, the inner lens 6_a_ can be firstly attached and fixed to the first surface 111_a_ of the circuit board 11_a_ (by glue or other forms by which the inner lens and the first surface can be connected and fixed), so that the light-emitting module 12_a_ on the first surface 111_a_ of the circuit board 11_a_ is covered by the inner lens 6_a_. Then, the connection member 3_s_ with the conductive column 4_a_ inserted therein is fixedly attached to the second surface 112_a_ of the circuit board 11_a_, so that the conductive column 4_a_ is in contact with the first conductive layer 132_a_ (namely, the part where the first conductive member 13_a_ matches with the conductive column 4_a_), this step may also be performed before the inner lens 6_a_ is installed. After that, the light board structure 1_a_ is placed in the bulb cap shell 2_a_ and make the second surface 112_a_ of the circuit board 11_a_ of the light board structure 1_a_ attached with the inner sidewall of the contracted structure 21_a_ of the bulb cap shell 2_a_, so that the second conductive layer 142_a_ of the second conductive member 14_a_ is in contact with the contracted structure 21_a_ of the bulb cap shell 2_a_. Afterwards, the open end of the bulb cover 5_a_ having the external threads 51_a_ is screwed into bulb cap shell 2_a_ to be locked, so that the light board structure 1_a_ is restricted and fixed in the bulb cap shell 2_a_ (namely, the light board structure 1_a_ is fixed between the contracted structure 21_a_ and the open end of the bulb cover 5_a_).

When the connection member 3_a_ is formed on the contracted structure of the bulb cap shell 2_a_ by injection molding beforehand, the step of separately attaching and fixing the connection member 3_a_ to the second surface 112_a_ of the circuit board 11_a_ can be removed in the aforementioned assembly steps. After the circuit board 11_a_ is restricted and fixed in the bulb cap shell 2_a_, the conductive column 4_a_ is inserted to make the conductive column 4_a_ contact with the first conductive layer 132_a_ of the first conductive member 13_a_. If the conductive column 4_a_ is molded and assembled together with the connection member 3_a_ during injection molding (i.e., injection molding with the metal part), there is no need to install the conductive column 4_a_ separately later.

Embodiment 10

Figure 28:
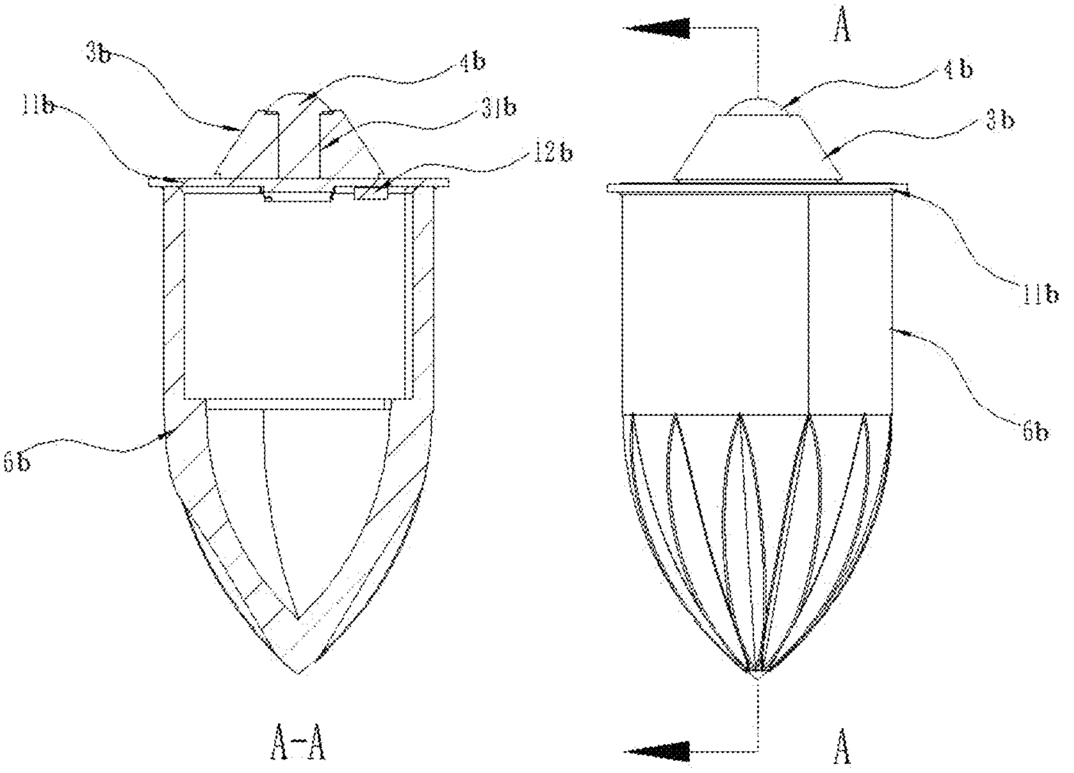
FIG. 28 is a cross-sectional view showing the combination of the light board structure with the inner lens and the combination of the connector with the conductive column when the light board structure according to Embodiment 9 of the present disclosure applied on a light bulb.
Figure 29:
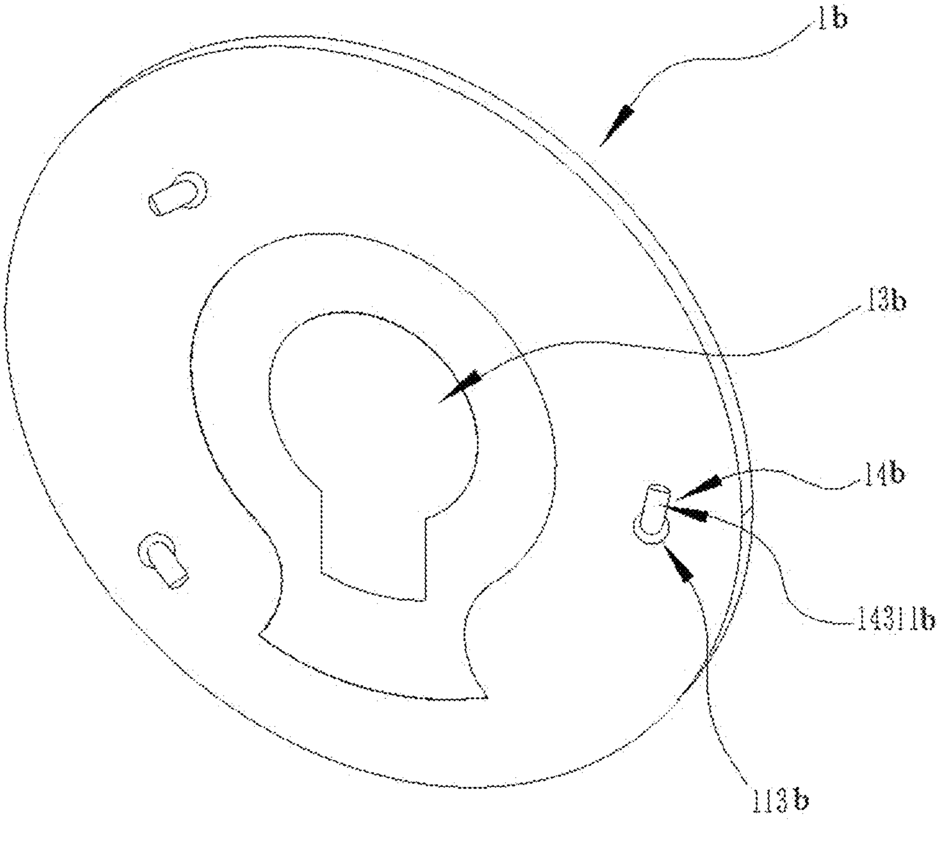
FIG. 29 is a perspective view of an implementation structure of the light board structure according to Embodiment 10 of the present disclosure.

As shown in FIG. 28 or FIG. 29, the light board structure 1_b_ of this embodiment is substantially the same as that of embodiment 9, except that the implementation of the second conductive member 14_b_ of this embodiment is different. In this embodiment, the second conductive member 14_b_ includes a connection wire 143_b_, an end of the connection wire 143_b_ is divided into at least one strand of conductive wire 1431_b_, and the end of the at least one strand of conductive wire 1431_b_ respectively passes through the circuit board 11_b_ and extends to the second surface 112_b_ of the circuit board 11_b_. The circuit board 11_b_ is correspondingly provided with a through hole 113_b_ for the conductive wire 1431_b_ to pass through; the other end of the connection wire 143_b_ is connected to the second terminal of the light emitting module 12_b_.

In the structure of this embodiment, the first conductive member 13_b_ is implemented in the form of the first conductive layer as described in embodiment 9. The first conductive member 13_b_ is arranged in the middle of the second surface 112_b_ and is connected to the first terminal of the light emitting module 12_b_.

On this basis, in the structure of this embodiment, when the end of the at least one strand of conductive wire 1431_b_ extends to the second surface 112_b_ of the circuit board 11_b_, the end may be positioned partially higher than the second surface 112_b_ shown. When there are a plurality of strands of the conductive wire 1421_b_, the plurality of strands of conductive wire 1421_b_ may be arranged in a annular array and pass through the circuit board 11_b_ from the first surface 111_b_ and extend to the second surface 112_b_. The ends of the plurality of strands of conductive wire 1421_b_ that are higher than the second surface 112_b_ may be used to contact the inner wall of the bulb cap shell of the light bulb when the light board structure 1_b_ is installed in the light bulb.

Figure 30:
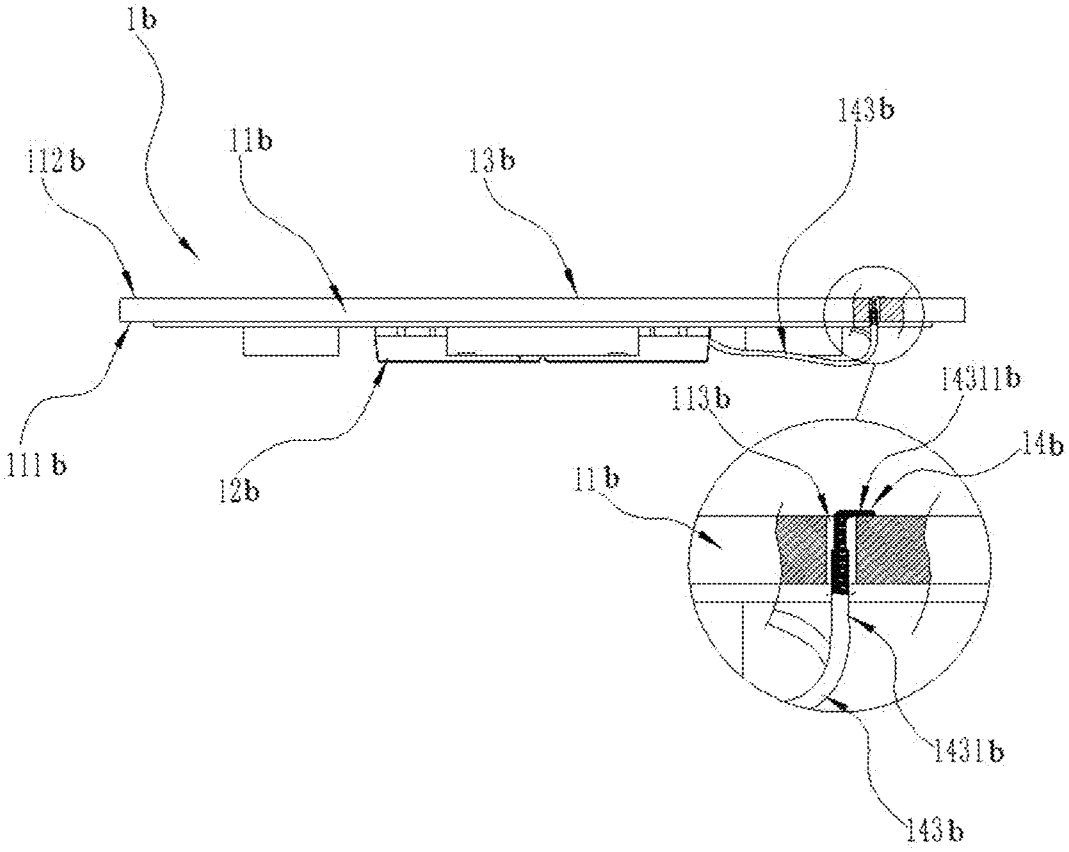
FIG. 30 is a cross-sectional view of a first implementation structure of the light board structure according to Embodiment 10 of the present disclosure.

In order to further improve the reliability of electrical contact of the light board structure 1_b_ installed in the light bulb, with reference to FIG. 30, another implementation of the second conductive member 14_b_ of the present embodiment is shown, the second conductive member 14_b_ of the present embodiment may further include a conductive sheet 144_b_. The conductive sheet 144_b_ is arranged on the second surface 112_b_ of the circuit board 11_b_ and is connected to the end of the conductive wire 1431_b_ arranged on the second surface 112_b_, namely, the conductive sheet 143_b_ is configured to further increase the contact reliability between the connection wire 142_b_ and the bulb cap shell.

The light board structure 1_b_ of this embodiment is installed in a light bulb by a way substantially the same as that of other embodiments, and will not be described in detail herein. At the same time, the reference numerals not mentioned in the drawings of this embodiment are substantially the same as those of embodiment 9, and will not be described in detail herein.

Embodiment 11

Figure 31:
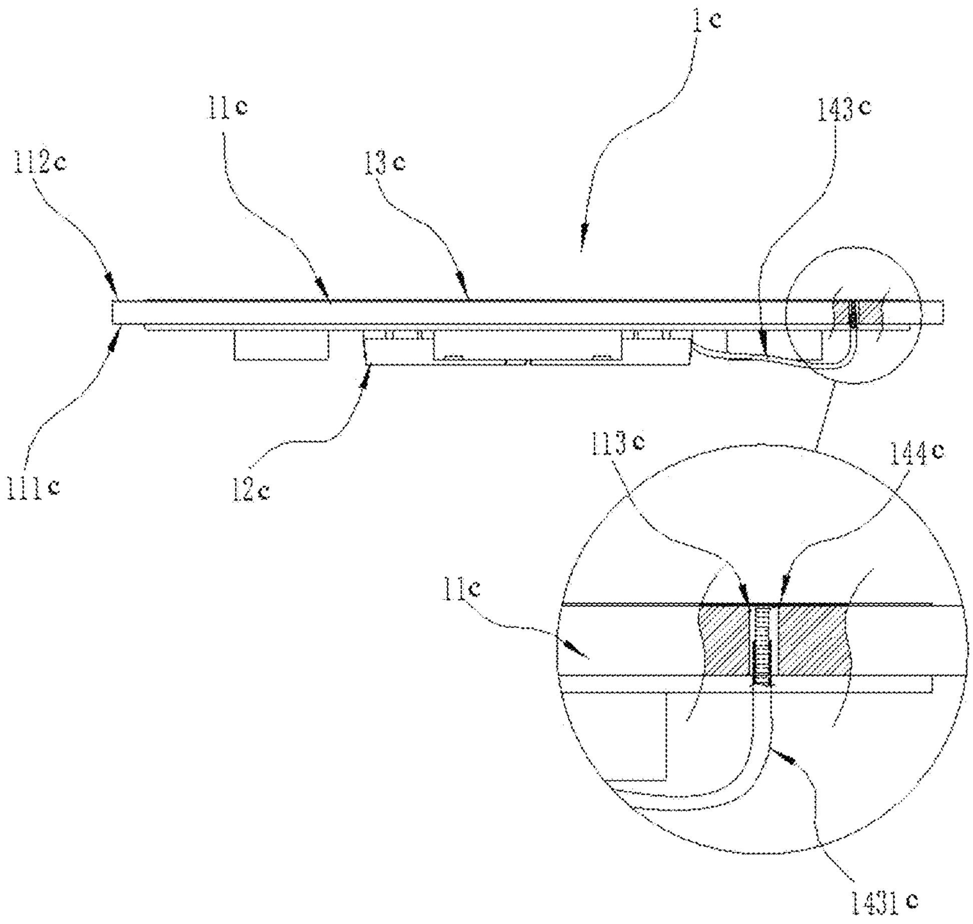
FIG. 31 is a cross-sectional view of a second implementation structure of the light board structure according to Embodiment 10 of the present disclosure.
Figure 32:
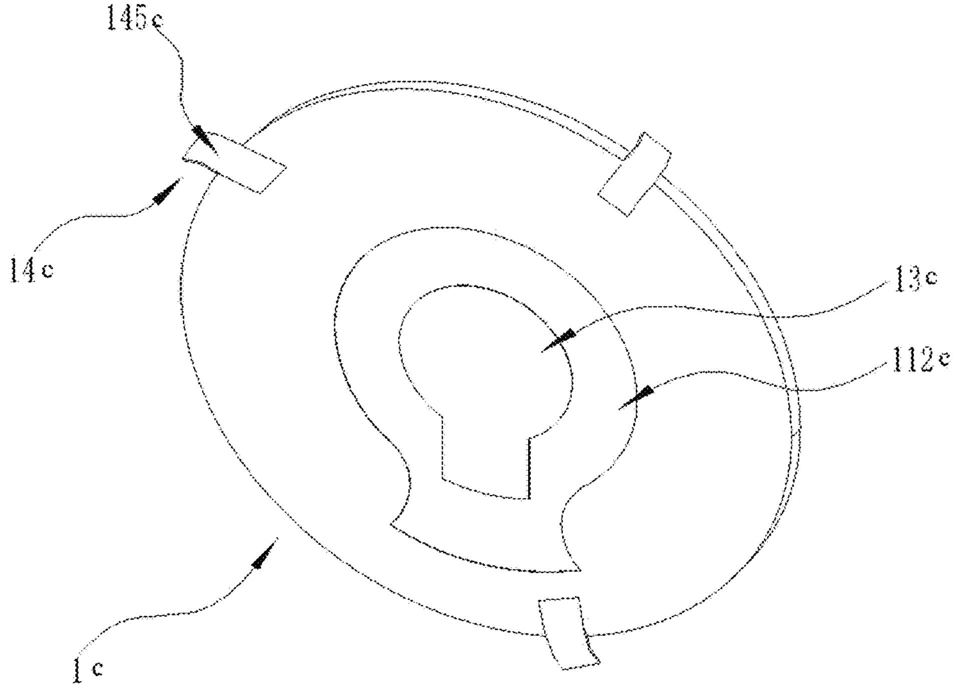
FIG. 32 is a perspective view of an implementation structure of the light board structure according to Embodiment 11 of the present disclosure.
Figure 33:
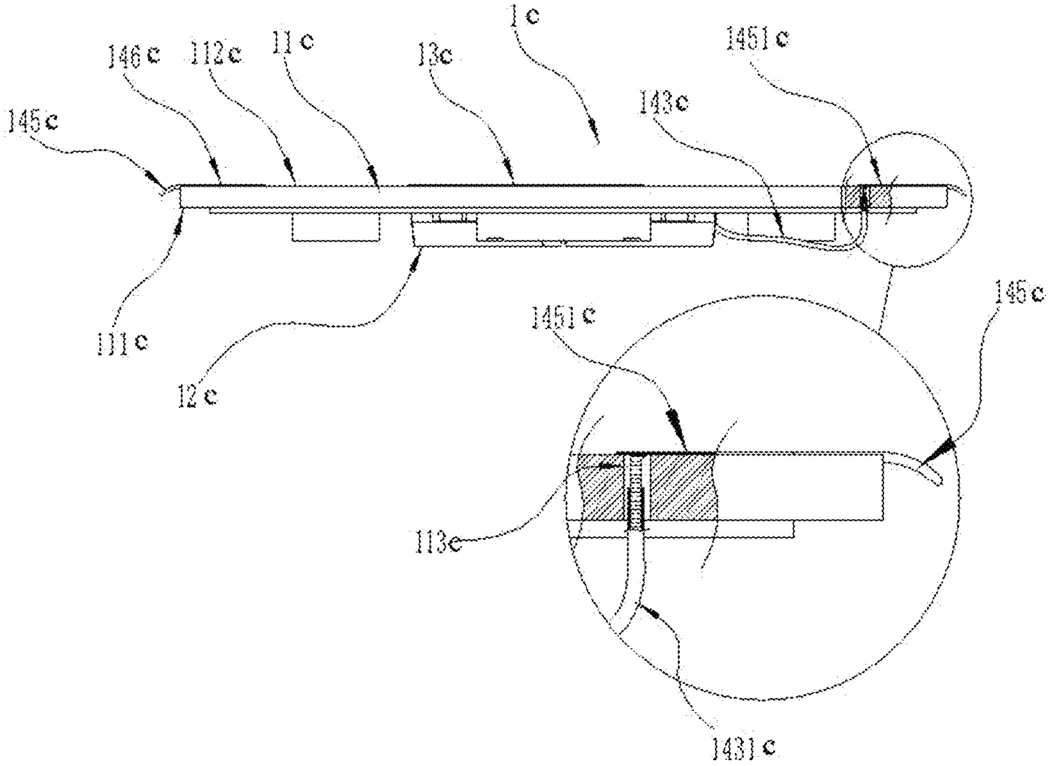
FIG. 33 is a cross-sectional view of an implementation structure of the light board structure according to Embodiment 11 of the present disclosure.
Figure 34:
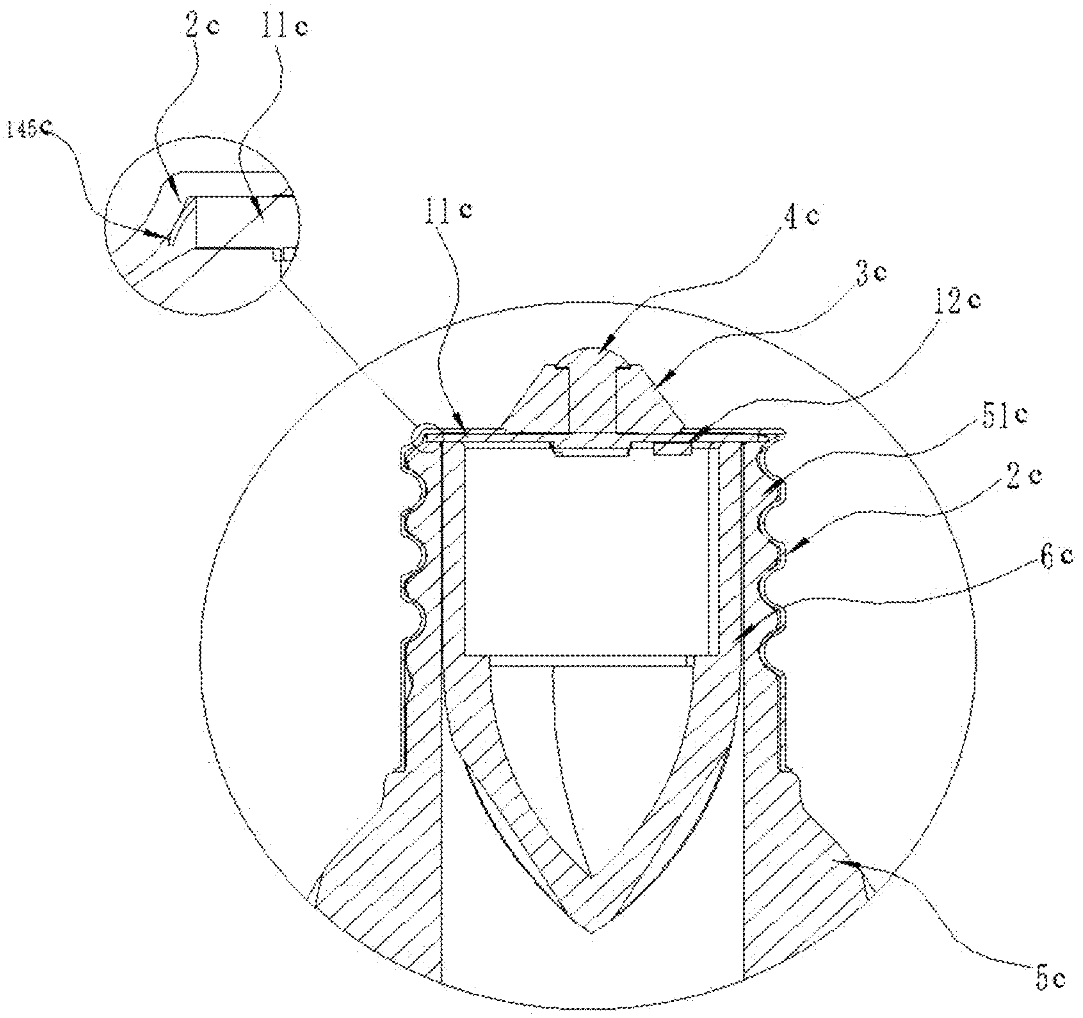
FIG. 34 is a schematic diagram showing the light board structure according to Embodiment 11 of the present disclosure installed in a light bulb.

As shown in FIGS. 31, 32 and 33, the light board structure 1_c_ of the present embodiment is substantially the same as that of the embodiment 10, except that the implementation of the second conductive member 14_c_ of the present embodiment is different. In the present embodiment, the second conductive member 14_c_ further includes at least one conductive elastic sheet 145_c_, an end of the conductive elastic sheet 145_c_ is fixed to the margin of the circuit board 11_c_, and the conductive elastic sheet 145_c_ has an extension portion 1451_c_ which is connected to the conductive wire 1431_c_ of the connection wire 143_c_. The circuit board 11_c_ is correspondingly provided with a through hole 113_c_ for the conductive wire 1431_c_ to pass through, and the other end of the conductive elastic sheet 145*c* extends outward away from the circuit board 11*c*. Further referring to FIG. 30, according to the implementation that the light board structure 1*c* is provided with the conductive elastic sheet 145*c*, when the light board structure 1*c* is installed in the light bulb, the conductive elastic sheet 145*c* contacts the inner wall of the bulb cap shell 2*c* (as shown in FIG. 34), wherein the conductive elastic sheet 145*c* (such as a copper sheet, an iron sheet or other conductive alloy, etc.) is deformable and has a/an rebounce/elastic force, thus the stability of the light-emitting module 12*c* of the light bulb being connected to the mains supply can be improved, and power failure due to insufficient contact surfaces or unstable contact between the light board structure 1*c* and the bulb cap shell 2*c* can be avoided.

In this embodiment, the implementation of the first conductive member 13*c* is the same as that of embodiment 10, namely, the first conductive member 13*c* is arranged in the middle of the second surface 112*c* and is connected to the first terminal of the light emitting module 12*c*.

Figure 35:
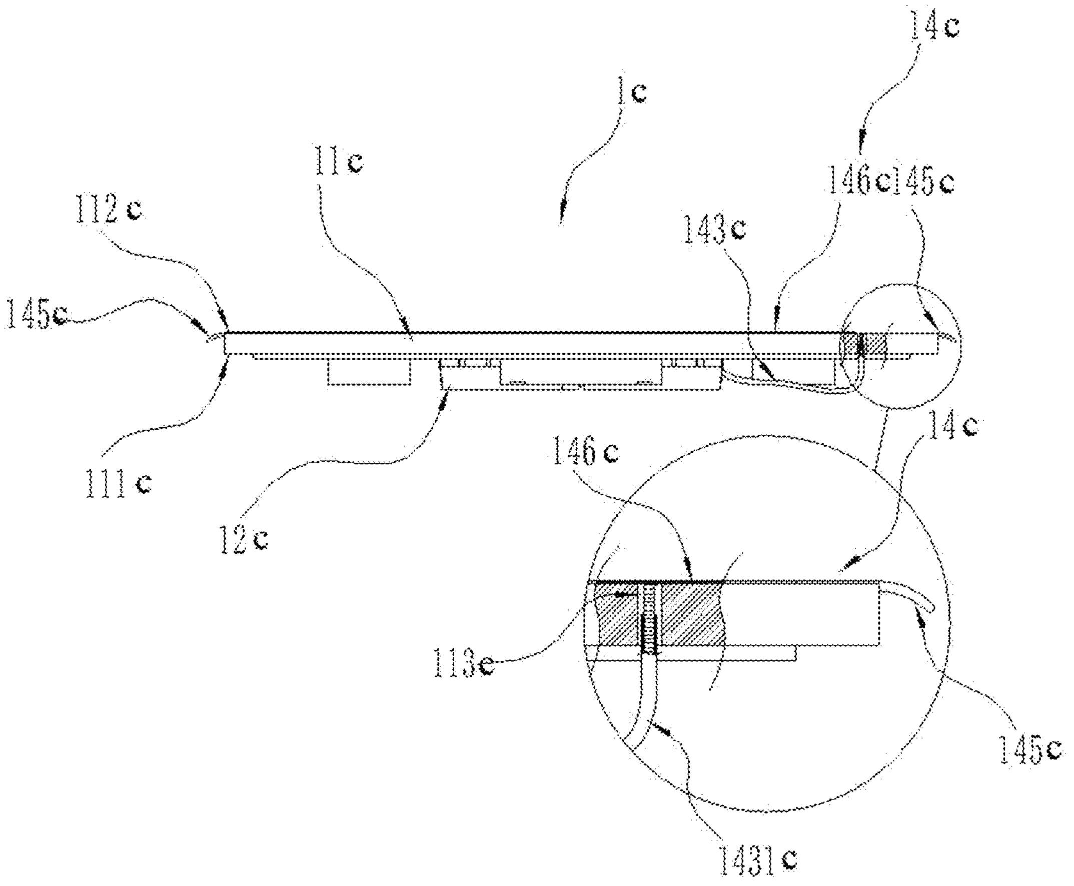
FIG. 35 is a cross-sectional view of a second implementations structure of the light board structure according to Embodiment 11 of the present disclosure.

As shown in FIG. 35, as an optional implementation of the second conductive member 14*c*, in order to further improve the conductive contact surface between the light board structure 1*c* and the bulb cap shell of the light bulb, the second conductive member 14*c* may further include a conductive layer 146*c* arranged on the second surface 112*c* of the circuit board 11*c*, and the conductive layer 146*c* has an annular shape, namely, the annular conductive layer 146*c* covers on an end of the conductive elastic sheet 145*c*, so as to improve the contact reliability between the second conductive member 14*c* and the inside of the bulb cap shell 2*c* when the light board structure 1*c* is installed.

Embodiment 12

Figure 3:
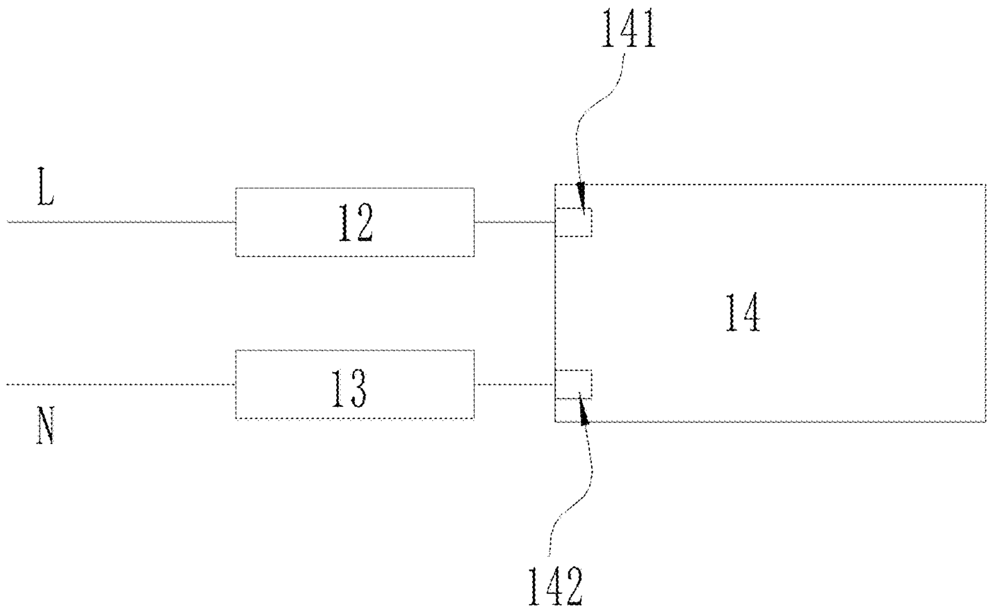
FIG. 3 is a schematic diagram showing the principle of connection between the light-emitting module and the conductive column and the conductive layer of the light board structure according to Embodiment 1 of the present disclosure.
Figure 36:
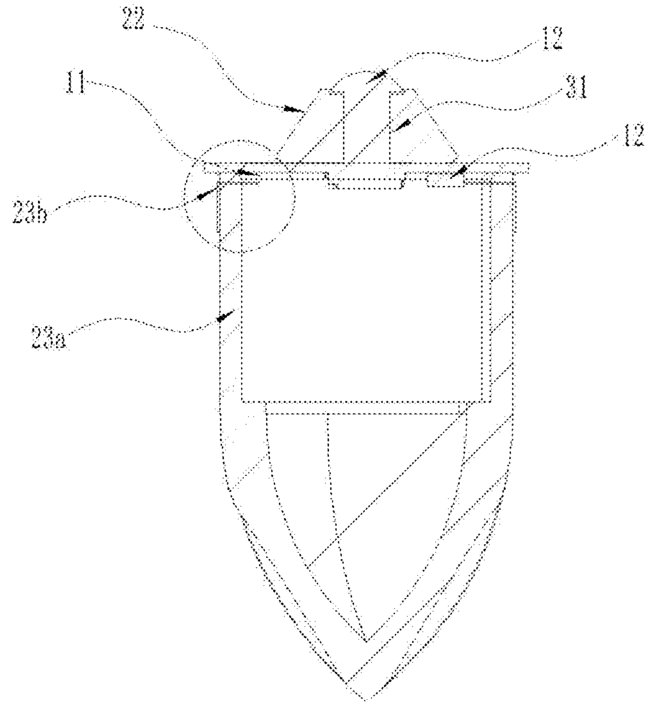
FIG. 36 is a cross-sectional view of a partial structure of a bulb cap according to Embodiment 12 of the present disclosure.
Figure 37:
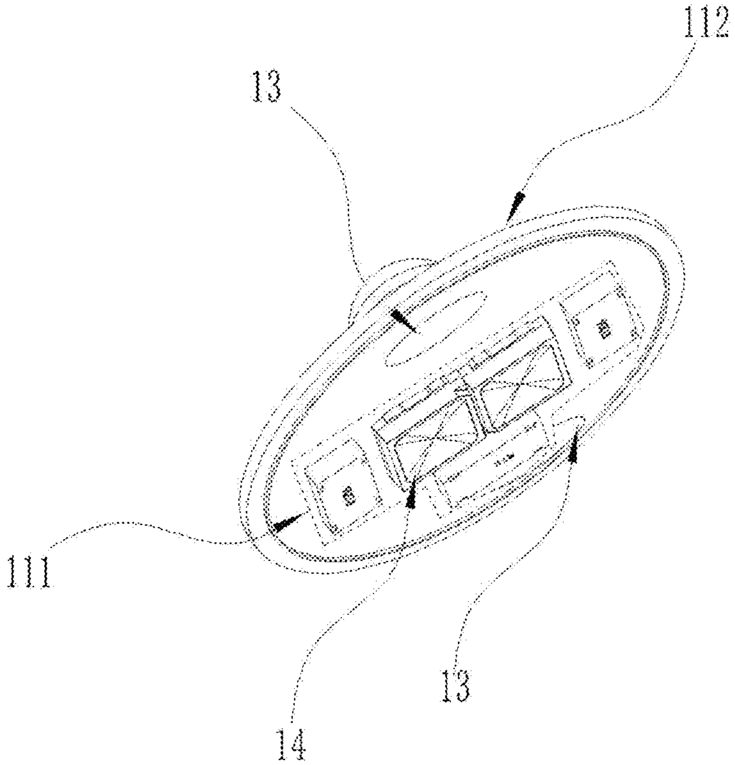
FIG. 37 is a structural schematic diagram of a light board structure according to Embodiment 12 of the present disclosure.

Referring to FIGS. 1-3 and Embodiment 1, the present embodiment provides a light board structure 1 for using in a light bulb. The light board structure 1 includes: a circuit board 11, wherein the circuit board 11 includes a first surface 111 and a second surface 112, the first surface 111 is provided with a light emitting module 14, and the light emitting module 14 has a first terminal 141 and a second terminal 142 for connecting to a power supply; a conductive column 12, wherein an end of the conductive column 12 is fixed on the middle of the second surface 112 of the circuit board 11 and is connected to the first terminal 141 of the light emitting module 14; and a conductive layer 13 arranged on the first surface 111 or the second surface 112 of the circuit board, wherein the conductive layer 13 includes at least one conductive contact, and the at least one conductive contact are arranged on a margin of the first surface 111 or the second surface 112 in intervals. FIGS. 36-37 show that two conductive contacts are arranged on the first surface 111, and the implementation that the conductive contacts are arranged on the second surface is similar to the implementation illustrated in the drawings.

In the implementation shown in FIGS. 36-39, the first terminal 141 and the second terminal 142 of the light emitting module 14 on the circuit board 11 are correspondingly connected to the conductive column 12 and the conductive layer 13 by configuring conductive holes on the circuit board 11, or by configuring through holes (i.e. holes that penetrate through the first surface 111 and second surface 112) and wires passing the through holes for connection, or by a way that an end portion of the conductive column 12 fixed on the middle of the second surface 112 further passes through the circuit board and extends to the first surface 111 of the circuit board 11 to be electrically connected to the first terminal of the light emitting module 14. All these methods are known methods to connect components on the circuit board 11, thus these methods may not be discussed in further details.

Figure 38:
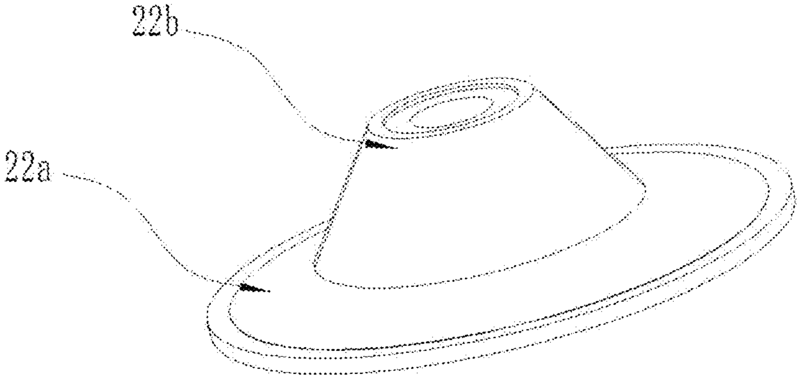
FIG. 38 is a structural schematic diagram of a gasket according to Embodiment 12 of the present disclosure.
Figure 39:
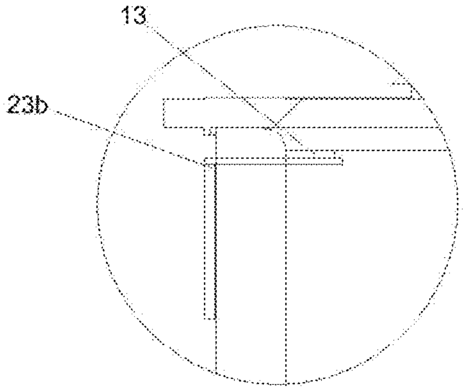
FIG. 39 shows a partially enlarged view of FIG. 36.

Furthermore, referring to FIGS. 36-38, the above-mentioned light board structure is applied in a bulb cap 2 which further includes the bulb cap housing 21 as shown in FIG. 6, the gasket 22 as shown in FIG. 24, a fixation member 23*a* as shown in FIG. 36, and conductive metal sheets 23*b* as shown in FIG. 39. The bulb cap housing 21 has a cylindrical structure with an opening at one end and a through hole at the other end. The gasket 22 includes an installation part 22*a* and a protrusion 22*b*. The protrusion 22*b* protrudes upward from the middle of the installation part 22*a*, and the installation part 22*a* matches with the top wall of the end of the bulb cap housing 21 having the through hole to assemble the gasket 22 with the bulb cap housing. The gasket 22 corresponds to the second surface 112 of the light board structure 1, the conductive column 12 passes through a through hole of the protrusion 22*b* of the gasket 22 and extends out of the bulb cap housing 21. The fixation member 23*a* has a hollow cylindrical structure, and the conductive metal sheets are inserted into the sidewall of the fixation member 23*a* at an end proximal to the gasket 22. A section of the conductive metal sheets 23*b* are located inside the cylindrical structure of the fixation member 23*a* and extend inwardly toward the axis for a certain distance but do not contact each other, while a section of the conductive metal sheets 23*b* are located on an outer sidewall of the cylindrical structure of the fixation member 23*a* and extend downward for a certain distance along the outer sidewall. After installation is completed, the section of the conductive metal sheets 23*b* located inside the cylindrical structure of the fixation member 23*a* are in electrical contact with the conductive contacts respectively, and the section of the conductive metal sheets 23*b* located outside the cylindrical structure of the fixation member 23*a* are in electrical contact with an inner sidewall of the bulb cap housing 21. The circuit board 11 is located inside the cylindrical structure, and an opening of the cylindrical structure at the upper end is fixedly connected with a lower end of the gasket 22 in ways such as adhesive connection or integrally formed by injection molding etc. Although FIGS. 36-39 show the implementation that the conductive contacts are arranged on the first surface of the circuit board, in some alternative implementations the conductive contacts may also be arranged on the second surface of the circuit board or even the side surface of the circuit board if applicable, other arrangements related to the inventive concept of the present application should all be considered falling within the scope of protection of the present disclosure.

As a possible implementation, the light emitting module 14 is an LED light emitting module which is supplied by mains power. The conductive column 12 is connected to the live line of the mains power and the conductive layer 13 is connected to the zero line of the mains power.

In the present embodiment, when the light board structure 1 is applied in a light bulb, the circuit board 11 is arranged inside the bulb cap housing and located inside the fixation member 23*a*. The conductive column 12 on the second surface 112 of the circuit board 11 extends out of the bulb cap housing to be connected to the live line of the mains power, and the conductive layer 13 on the second surface 112 is connected to the bulb cap housing to be connected to the zero line of the mains power.

The above description merely involves some embodiments of the present disclosure, and is not intended to limit the protection scope of the present disclosure. Any equivalent device or equivalent process made based on the contents of the present disclosure, or being directly or indirectly used in other related technical fields, should also be considered as falling within the protection scope of the present disclosure.

What is claimed is:

1. A light board structure for a light bulb, comprising:

a circuit board, wherein the circuit board has a first surface and a second surface located opposite to each other, the first surface is provided with a light emitting module, and the light emitting module has a first terminal and a second terminal configured to connect to a power supply;

a first conductive member, wherein an end of the first conductive member is fixed to a middle part of the second surface of the circuit board and is electrically connected to the first terminal of the light emitting module; and a second conductive member, wherein the second conductive member is arranged on the circuit board, the second conductive member is spaced apart from the first conductive member and is insulated with the first conductive member, the second conductive member is electrically connected to the second terminal of the light emitting module.

2. The light board structure according to claim 1, wherein the first conductive member comprises a conductive column and the second conductive member comprises a conductive layer;

the conductive layer is arranged on the second surface of the circuit board, the conductive layer has an annular structure, and the conductive column is located within the annular structure of the conductive layer; and an outer edge of the annular structure of the conductive layer extends to an outer edge of the second surface of the circuit board, or a separation area is formed between the outer edge of the annular structure of the conductive layer and the outer edge of the second surface of the circuit board.

3. The light board structure according to claim 2, wherein, at least one conductive layer is provided, and all of the at least one conductive layer is arranged on the second surface and is electrically connected to the second terminal of the light emitting module;

when one conductive layer is provided, the conductive layer is located in a region of the second surface on a side of the conductive column; and when a plurality of conductive layers are provided, the plurality of conductive layers are arranged on the second surface surrounding around the conductive column in an annular pattern.

4. The light board structure according to claim 2, wherein, the light emitting module is an LED light emitting module, the light emitting module is powered by a mains supply, the conductive column is configured to connect to a live wire of the mains supply, and the conductive layer is configured to connect to a neutral wire of the mains supply; and an end of the conductive column fixed on the middle part of the second surface of the circuit board further passes through the circuit board and extends to the first surface of the circuit board and is electrically connected to the first terminal of the light emitting module.

5. The light board structure according to claim 1, wherein the first conductive member comprises a conductive column connected to the middle part of the second surface by threads or riveting, and the conductive column is connected to the first terminal of the light emitting module.

6. The light board structure according to claim 1, wherein the first conductive member comprises a first conductive layer arranged on the middle part of the second surface, and the first conductive layer is electrically connected to the first terminal of the light emitting module.

7. The light board structure according to claim 6, wherein the second conductive member comprises a second conductive layer arranged on the second surface, and the second conductive layer is electrically connected to the second terminal of the light emitting module;

the second conductive layer is a closed annular structure or a closed non-annular structure;

when the second conductive layer is the closed annular structure, the second conductive layer surrounds the first conductive member, and a first electrical insulation region is formed between the first conductive member and the second conductive layer, wherein an outer edge of the second conductive layer extends to an outer edge of the circuit board or a second electrical insulation region is formed between the outer edge of the second conductive layer and the outer edge of the circuit board;

when the second conductive layer is the closed non-annular structure, remaining areas of the second surface except for positions where the first conductive layer and the second conductive layer are arranged are all electrically insulated areas, a part of the second conductive layer proximal to the outer edge of the circuit board extends to the outer edge of the circuit board or leaves a separation area with the outer edge of the circuit board.

8. The light board structure according to claim 6, wherein the second conductive member comprises a connection wire, and a first end of the connection wire is divided into at least one strand of conductive wire, and an end portion of the at least one strand of conductive wire passes through the circuit board and extends to the second surface of the circuit board, the circuit board is correspondingly provided with a through hole for the conductive wire to pass through, a second end of the connection wire is electrically connected to the second terminal of the light emitting module.

9. The light board structure according to claim 8, wherein the second conductive member further comprises a conductive sheet, the conductive sheet and the conductive wire are provided in an one-to-one correspondence, the conductive sheet is arranged on the second surface and is connected to the corresponding conductive wire.

10. The light board structure according to claim 8, wherein the second conductive member further comprises a conductive elastic sheet, the conductive elastic sheet and the conductive wire are in an one-to-one correspondence, a first end of the conductive elastic sheet is arranged on a margin of the second surface of the circuit board and is connected to the corresponding conductive wire, a second end of the conductive elastic sheet extends outwards outside the circuit board.

11. A bulb cap, comprising:

a light board structure, wherein the light board structure comprises:

a circuit board, wherein the circuit board has a first surface and a second surface located opposite to each other, the first surface is provided with a light emitting module, and the light emitting module has a first terminal and a second terminal configured to connect to a power supply;

a conductive column, wherein an end of the conductive column is fixed to a middle part of the second surface of the circuit board and is electrically connected to the first terminal of the light emitting module; and a conductive layer, wherein the conductive layer is arranged on the circuit board, the conductive layer is spaced apart from the conductive column and is insulated with the conductive column, the conductive layer is electrically connected to the second terminal of the light emitting module;

a bulb cap shell, wherein the bulb cap shell is a cylindrical shell structure with two ends open, the bulb cap shell is formed of a conductive material and is configured to connect with a bulb socket, an end of the bulb cap shell has a contracted structure;

a gasket, wherein the gasket is made of an elastic insulating material, a first end surface of the gasket is attached to the second surface of the circuit board, and the gasket is provided with a through hole corresponding to the conductive column;

wherein, the circuit board of the light board structure is arranged in the cylindrical shell structure at an end of the bulb cap shell, a second end surface of the gasket is at least partially in contact with an inner wall of the contracted structure of the bulb cap shell, another end of the conductive column sequentially passes through the through hole of the gasket and the contracted structure of the bulb cap shell, and is exposed outside the bulb cap shell; the conductive column is spaced apart and insulated with the bulb cap shell, and the conductive layer on the second surface of the circuit board is in direct or indirect contact with an inner wall of the bulb cap shell.

12. The bulb cap according to claim 11, wherein the bulb cap further comprises:

a conductive ring, wherein the conductive ring is an electrically conductive member, the conductive ring is arranged on the second surface of the circuit board and is in contact with the conductive layer, an outer circumferential side of the conductive ring is provided with at least one conductive sheet extending outwards at intervals, and the conductive sheet is configured to be attached with an inner wall of the bulb cap shell;

wherein, the conductive ring is spaced apart and insulated from the conductive column.

13. The bulb cap according to claim 12, wherein an outer contour of the gasket is matched with the circuit board of the light board structure, the first end surface of the gasket is attached with the second surface of the circuit board and partially covers the conductive ring.

14. The bulb cap according to claim 13, wherein the conductive column and the through hole are in an interference fit.

15. The bulb cap according to claim 14, wherein the second end surface of the gasket is provided with a protrusion corresponding to the contracted structure of the bulb cap shell, the protrusion partially passes through the contracted structure of the bulb cap shell, and the through hole extends through the protrusion.

16. A method for assembling a bulb cap, wherein the bulb cap comprises a light board structure and a bulb cap shell, wherein the light board structure comprises:

a circuit board, the circuit board has a first surface and a second surface located opposite to each other, the first surface is provided with a light emitting module, and the light emitting module has a first terminal and a second terminal configured to connect to a power supply;

a conductive column, wherein an end of the conductive column is fixed to a middle part of the second surface of the circuit board and is electrically connected to the first terminal of the light emitting module; and a conductive layer, wherein the conductive layer is arranged on the circuit board, the conductive layer is spaced apart from the conductive column and is insulated with the conductive column, the conductive layer is electrically connected to the second terminal of the light emitting module;

wherein the bulb cap shell is a cylindrical shell structure with two ends open and is configured to connect to a bulb socket, and an end of the bulb cap shell has a contracted structure; the bulb cap shell is configured to connect to a neutral line of the power supply, and the conductive column is configured to connect to the live line of the power supply;

the method for assembling the bulb cap comprises:

putting the light board structure in the bulb cap shell to make the conductive layer in direct or indirect contact with an inner wall of the bulb cap shell, and passing the conductive column through the contracted structure of the bulb cap shell to be exposed outside the bulb cap shell.

17. The method for assembling the bulb cap according to claim 16, wherein the bulb cap further comprises a gasket and a conductive ring, the gasket is made of an elastic insulating material, and the gasket is provided with a through hole corresponding to the conductive column; the conductive ring is an electrically conductive member, and at least one conductive sheet extending outward is provided at intervals on an outer periphery of the conductive ring, and the at least one conductive sheet is configured to be attached with the inner wall of the bulb cap shell;

the method for assembling the bulb cap further comprises:

attaching an end surface of the gasket to the second surface of the circuit board, and passing the conductive column through the through hole of the gasket;

arranging the conductive ring on the circuit board and making the conductive ring in contact with the conductive layer;

putting the light board structure equipped with the gasket and the conductive ring in the bulb cap shell and making the conductive layer in direct or indirect contact with the inner wall of the bulb cap shell, and passing the conductive column through the contracted structure of the bulb cap shell to be exposed outside the bulb cap shell.

18. A bulb cap, comprising:

a light board structure, wherein the light board structure comprises a circuit board having a first surface and a second surface arranged oppositely, the first surface is provided with a light emitting module, and the light emitting module has a first terminal and a second terminal for connecting to a mains power supply;

a conductive column, wherein an end of the conductive column is fixed on a middle part of the second surface of the circuit board and is connected to the first terminal of the light emitting module;

a conductive layer, wherein the conductive layer is arranged on the first surface or the second surface of the circuit board, the conductive layer includes at least one conductive contact configured on a margin of the first surface or the second surface at intervals, and the at least one conductive contact is connected to the second terminal of the light emitting module;

the bulb cap further comprises: a bulb cap housing, a gasket, a fixation member and conductive metal sheets, wherein the gasket is connected to the fixation member and is installed inside the bulb cap housing; the conductive metal sheets are inserted into a sidewall of the fixation member at a side proximal to the gasket, a first end of each conductive metal sheet extends into an inner side of the fixation member and is in electric contact with the conductive contact, a second end of each conductive metal sheet extends downward along an outer sidewall of the fixation member and is in electric contact with the bulb cap housing.

* * * * *